Sept. 7, 1943.  J. W. BRYCE ET AL  2,328,611
DIVIDING MACHINE
Original Filed June 10, 1938   21 Sheets-Sheet 2
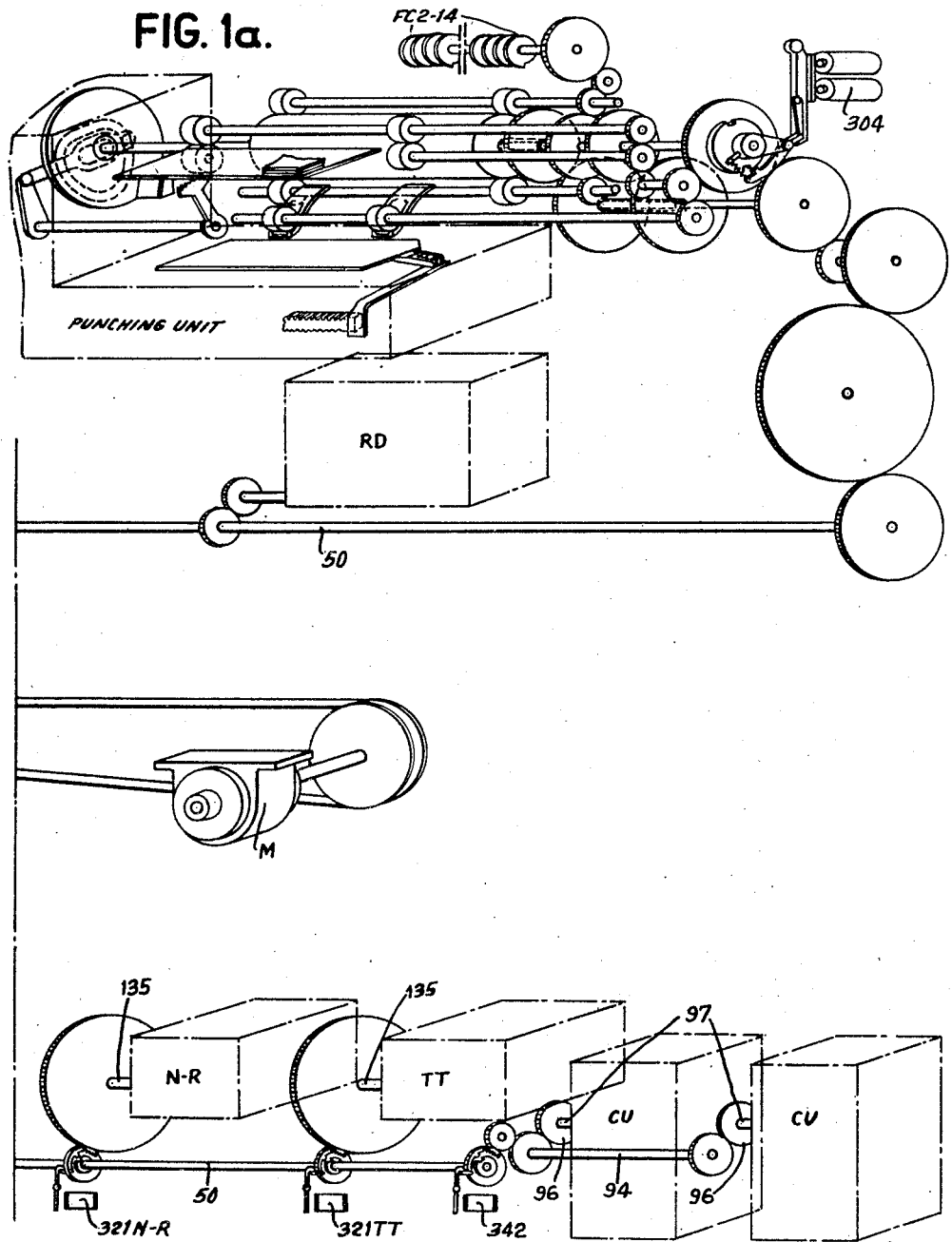

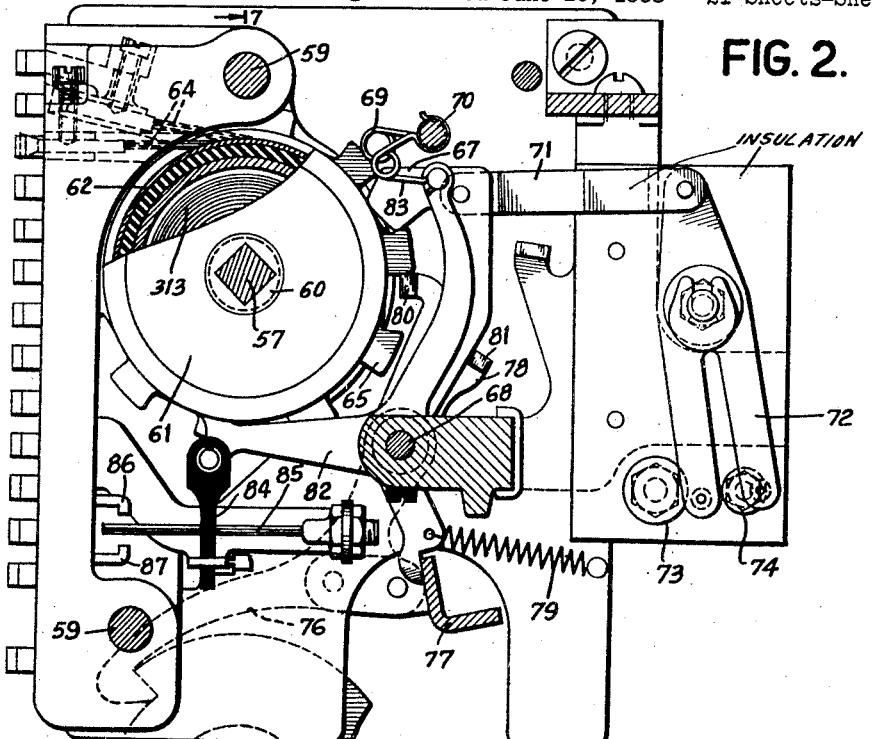
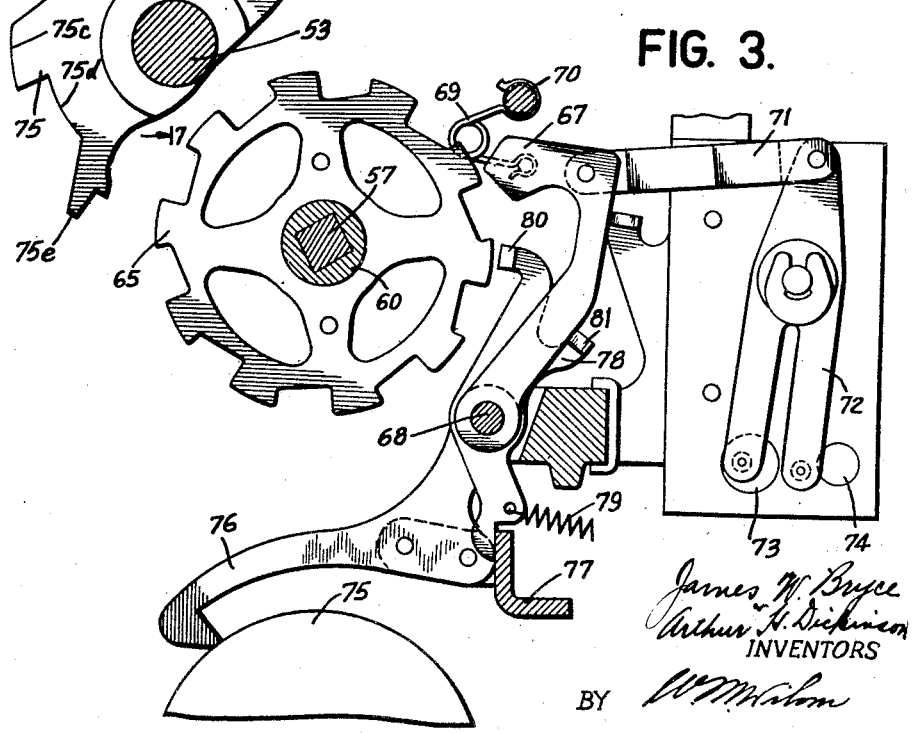

Sept. 7, 1943.    J. W. BRYCE ET AL    2,328,611
DIVIDING MACHINE
Original Filed June 10, 1938    21 Sheets-Sheet 4

James W. Bryce
Arthur H. Dickinson
INVENTORS
BY
ATTORNEY

Sept. 7, 1943.                J. W. BRYCE ET AL                2,328,611
                                DIVIDING MACHINE
                    Original Filed June 10, 1938    21 Sheets-Sheet 5
FIG. 7.                        FIG. 8.
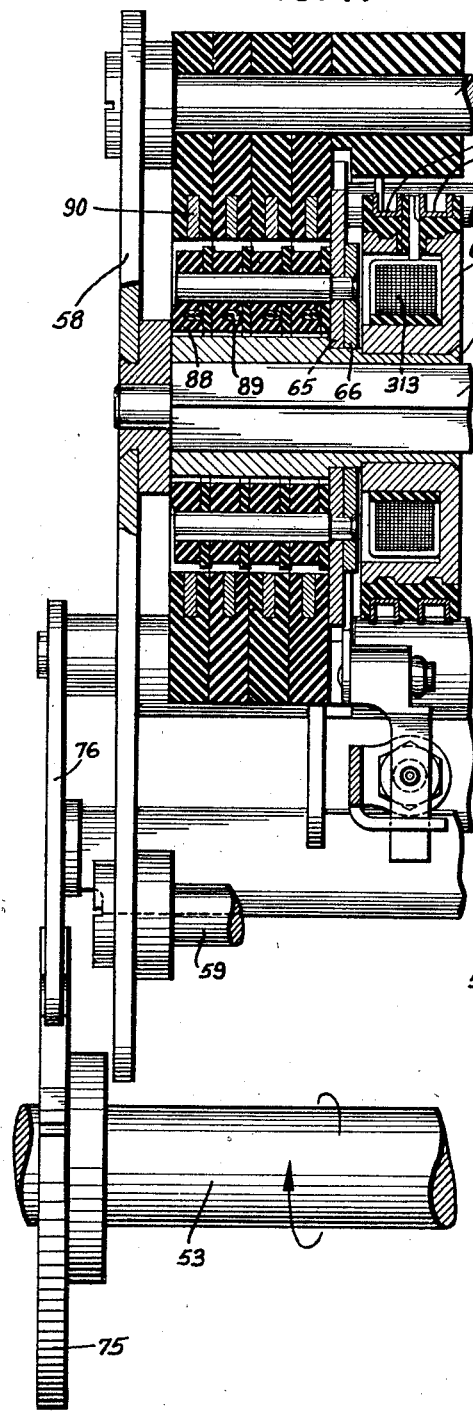
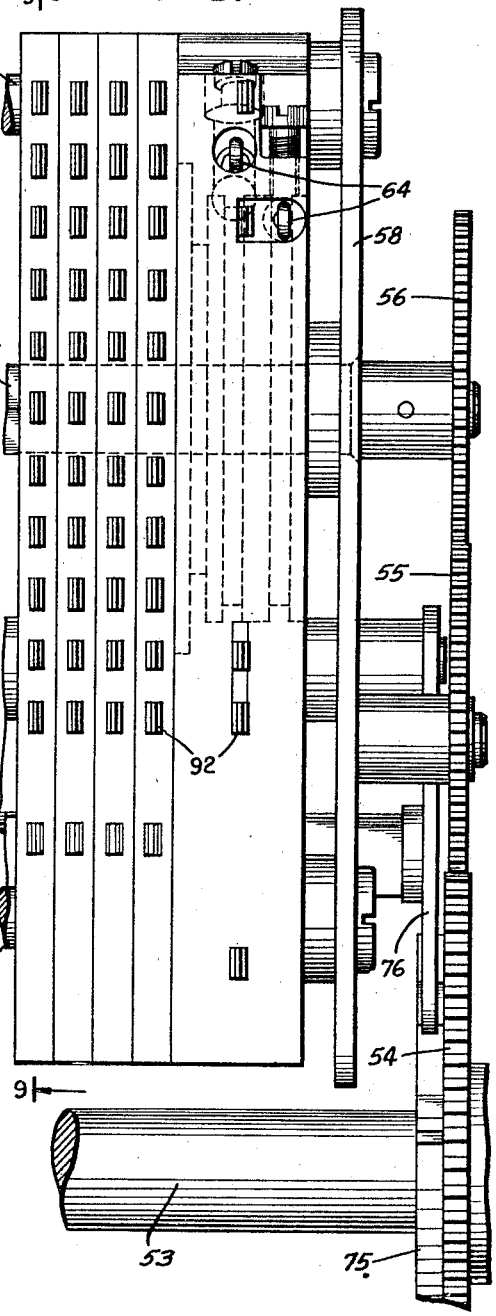

Sept. 7, 1943.   J. W. BRYCE ET AL   2,328,611
DIVIDING MACHINE

Original Filed June 10, 1938   21 Sheets-Sheet 6

James W. Bryce
Arthur H. Dickinson
INVENTORS

BY   W. T. Wilson
ATTORNEY

Sept. 7, 1943.　　J. W. BRYCE ET AL　　2,328,611
DIVIDING MACHINE
Original Filed June 10, 1938　　21 Sheets-Sheet 7

James W. Bryce
Arthur H. Dickinson
INVENTORS

BY
ATTORNEY

Sept. 7, 1943.　　　J. W. BRYCE ET AL　　　2,328,611
DIVIDING MACHINE
Original Filed June 10, 1938　　21 Sheets-Sheet 8

James W. Bryce
Arthur H. Dickinson
INVENTORS

BY
ATTORNEY

Sept. 7, 1943. J. W. BRYCE ET AL 2,328,611
DIVIDING MACHINE
Original Filed June 10, 1938 21 Sheets-Sheet 9

James W. Bryce
Arthur H. Dickinson
INVENTORS

BY
ATTORNEY

Sept. 7, 1943.   J. W. BRYCE ET AL   2,328,611
DIVIDING MACHINE
Original Filed June 10, 1938   21 Sheets-Sheet 10

James W. Bryce
Arthur H. Dickinson
INVENTORS

BY *W. M. Wilson*
ATTORNEY

Sept. 7, 1943.　　　　J. W. BRYCE ET AL　　　　2,328,611
DIVIDING MACHINE
Original Filed June 10, 1938　　21 Sheets-Sheet 11
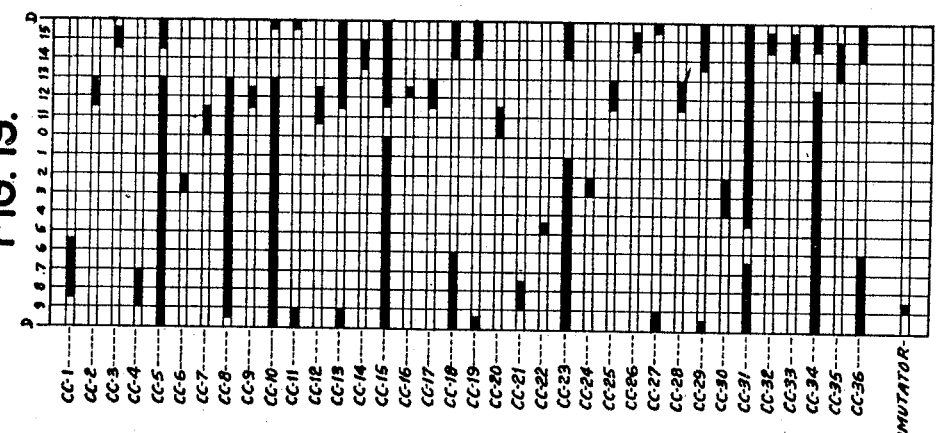
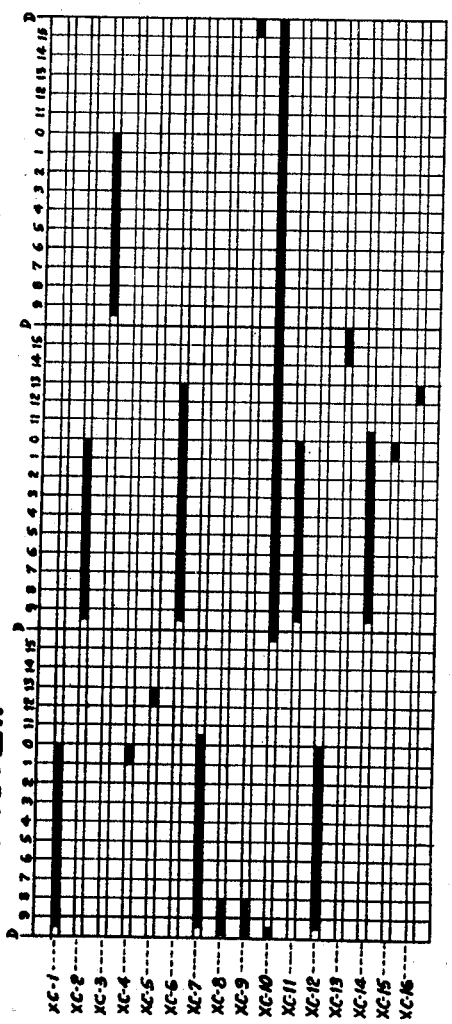
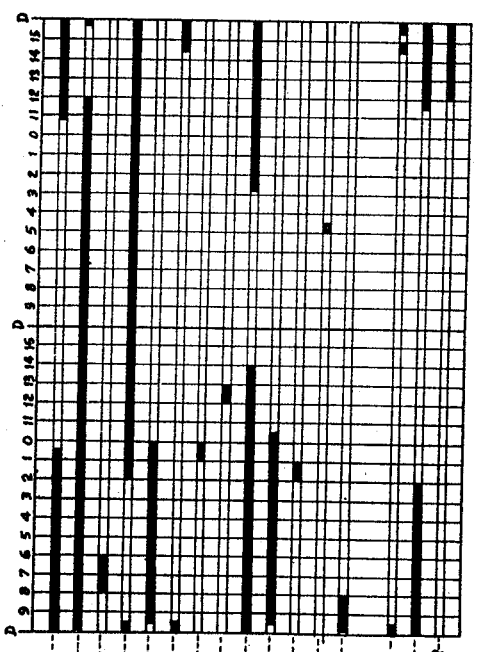
James W. Bryce
Arthur H. Dickinson
INVENTORS
BY
ATTORNEY

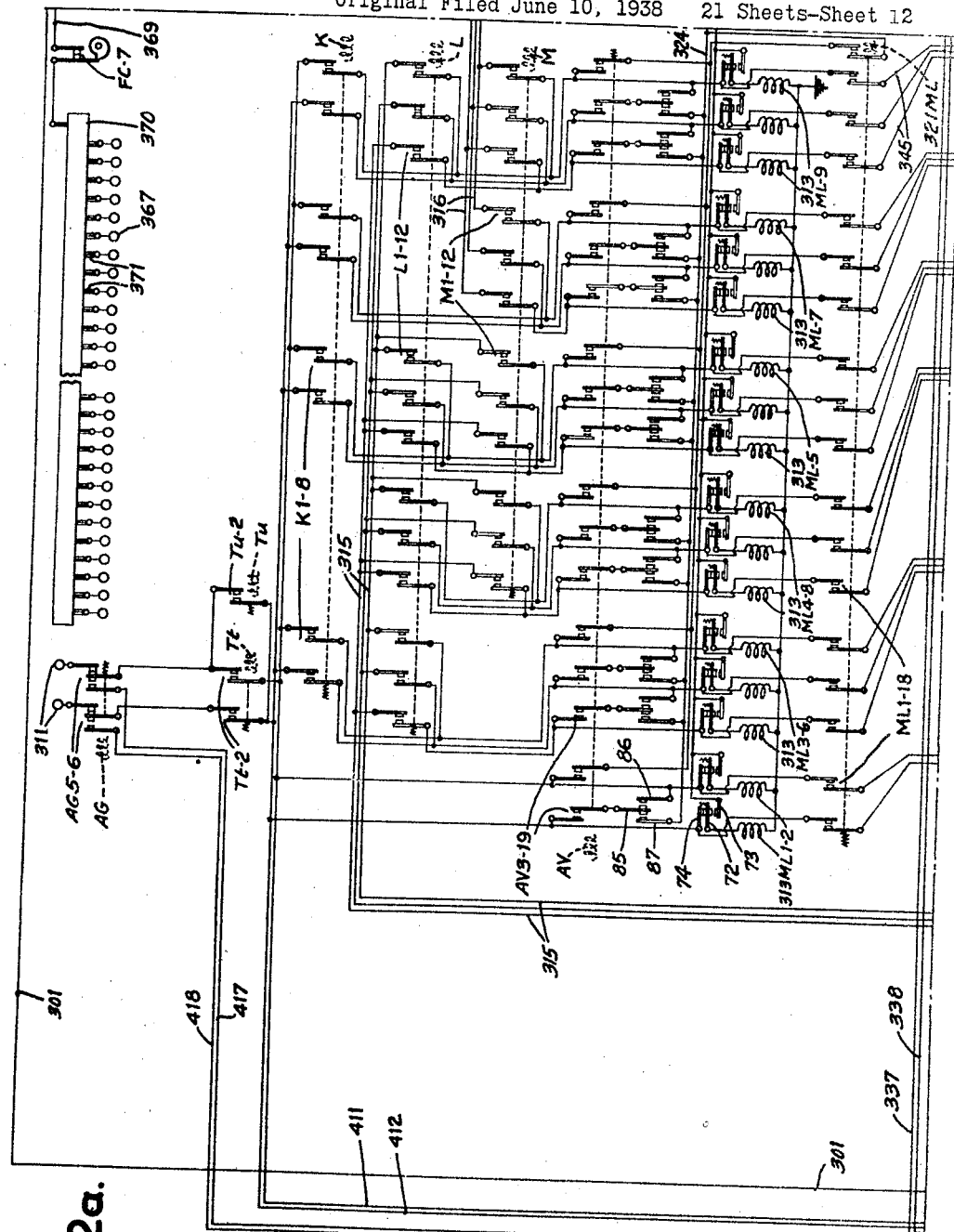

Sept. 7, 1943.  J. W. BRYCE ET AL  2,328,611
DIVIDING MACHINE
Original Filed June 10, 1938    21 Sheets-Sheet 13

INVENTORS
James W. Bryce
BY Arthur H. Dickinson
ATTORNEY

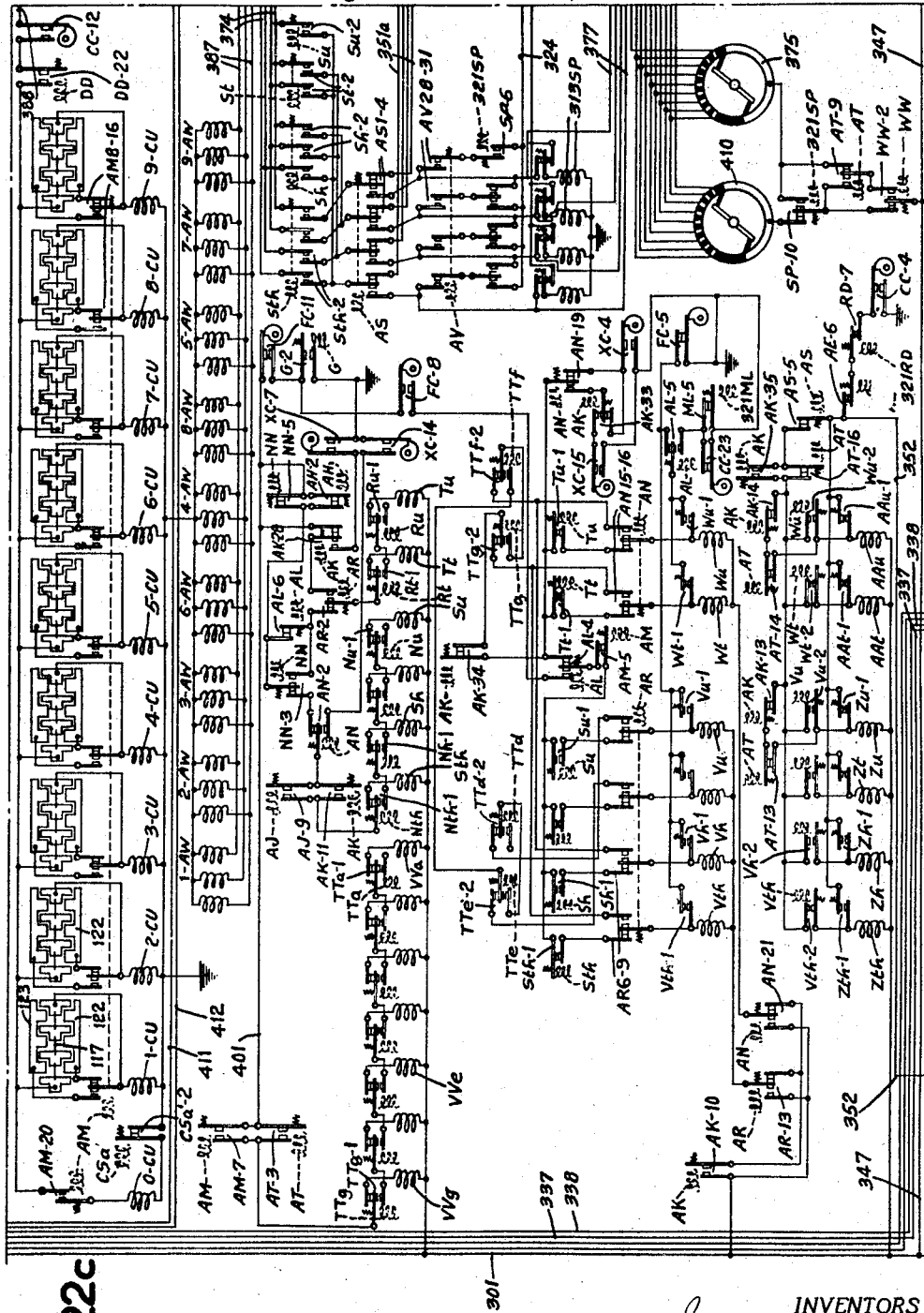

FIG.22d

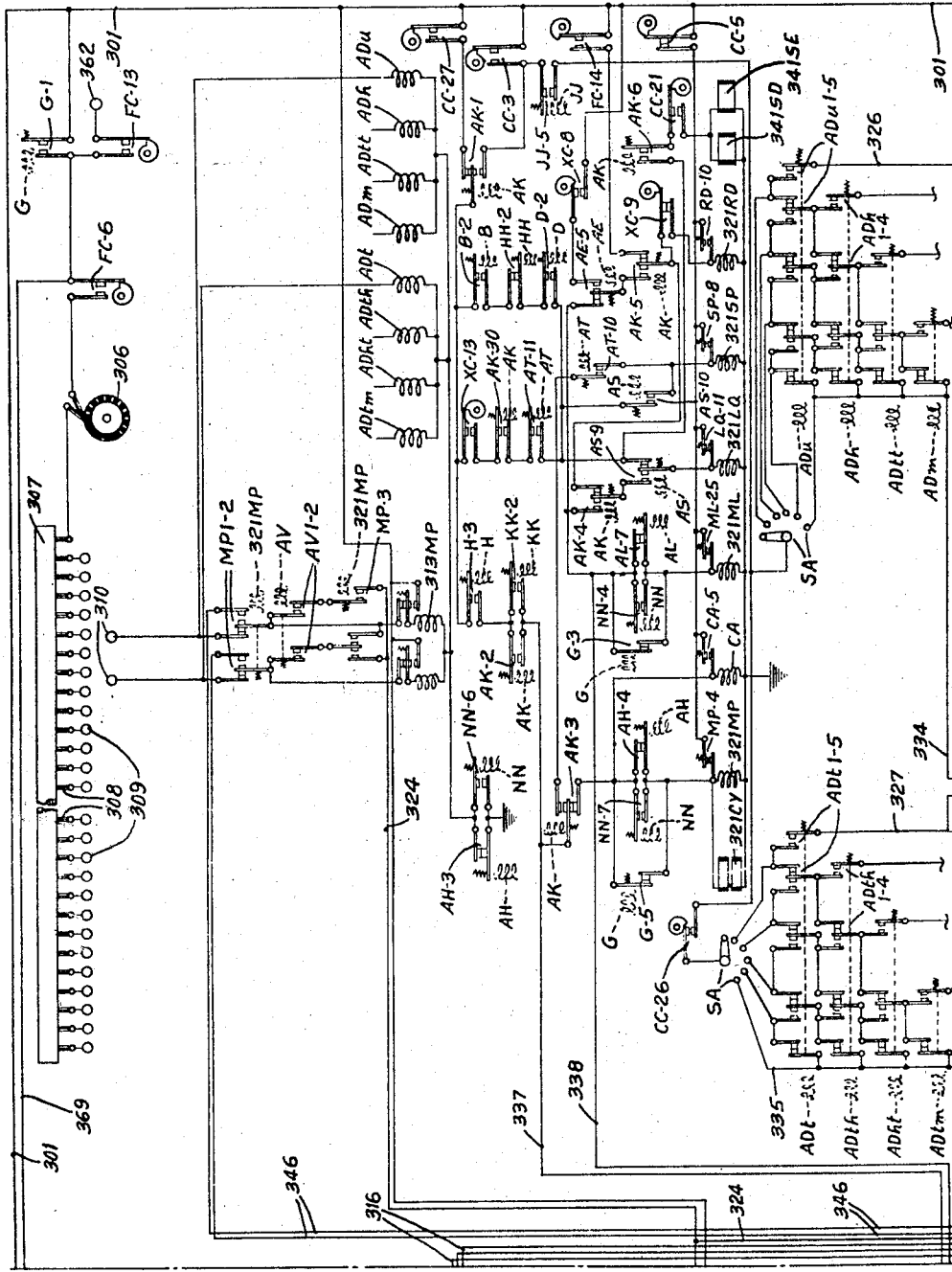

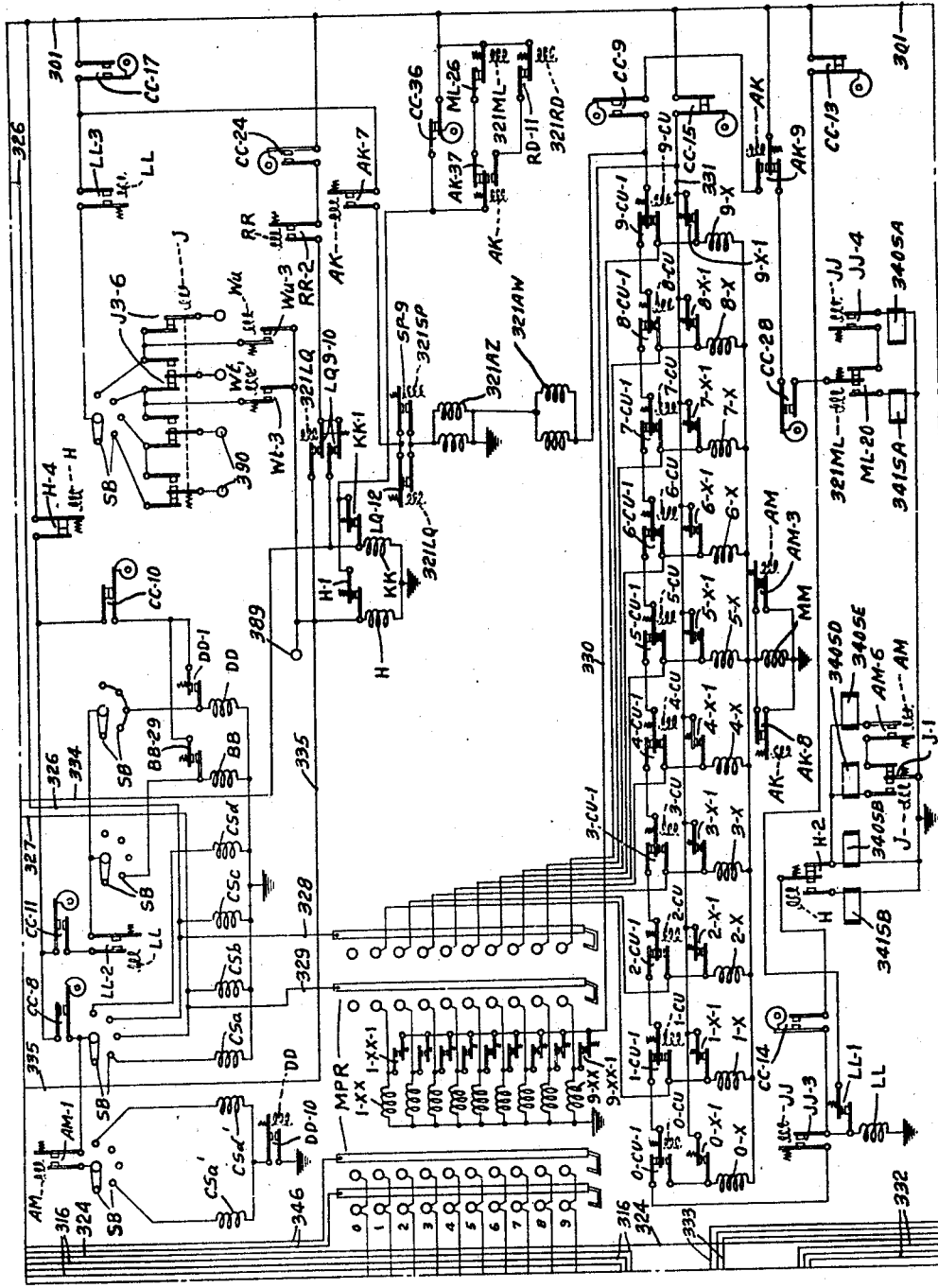

Sept. 7, 1943. J. W. BRYCE ET AL 2,328,611
DIVIDING MACHINE
Original Filed June 10, 1938 21 Sheets-Sheet 18

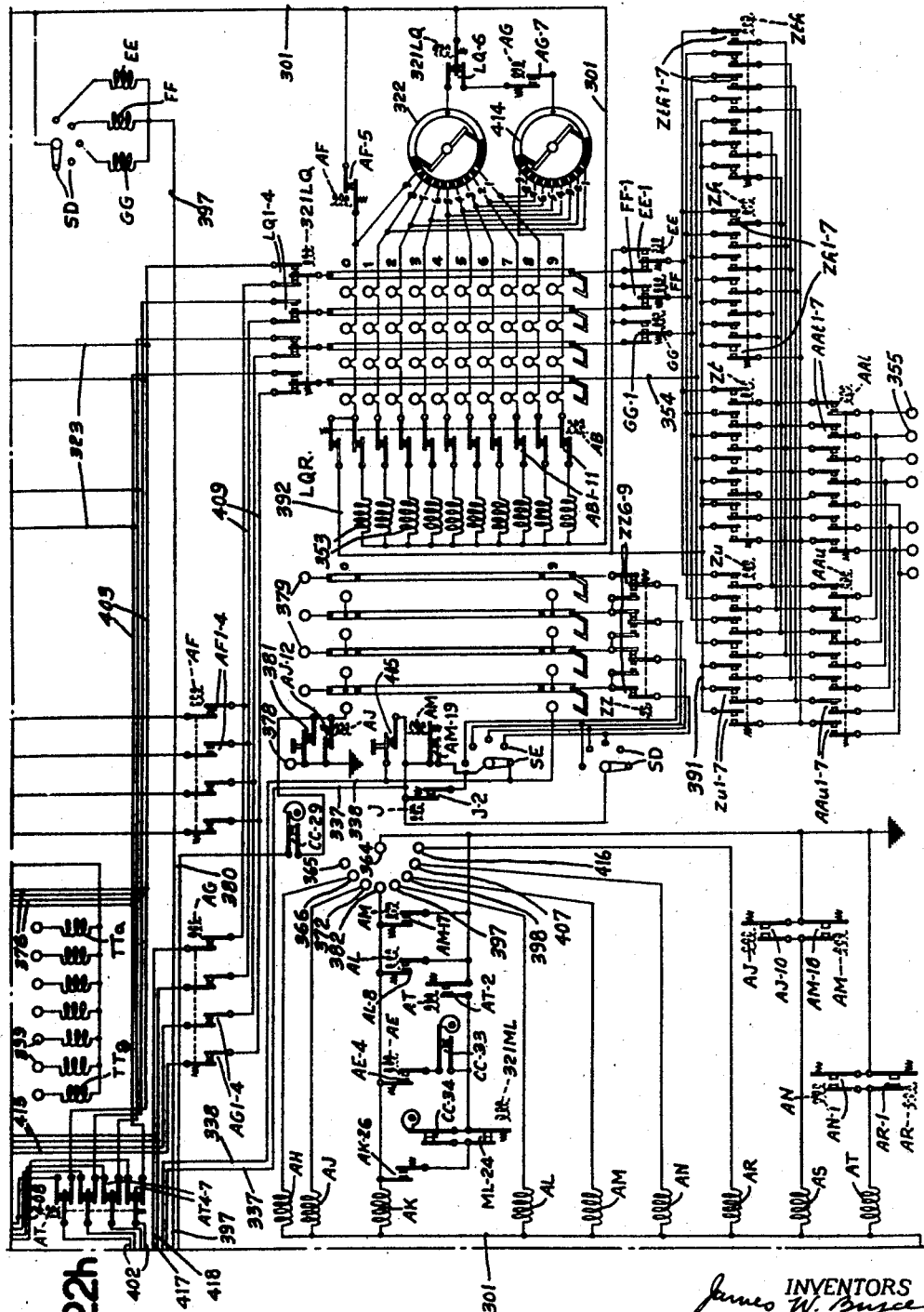

Patented Sept. 7, 1943

2,328,611

UNITED STATES PATENT OFFICE

2,328,611

DIVIDING MACHINE

James W. Bryce, Glen Ridge, N. J., and Arthur H. Dickinson, Scarsdale, N. Y., assignors to International Business Machines Corporation, New York, N. Y., a corporation of New York Original application June 10, 1938, Serial No. 213,044. Divided and this application April 18, 1942, Serial No. 439,454

7 Claims. (Cl. 235—61.6)

This invention relates to calculating machines, particularly of the record controlled type which are especially adapted to effect the computing operation of division and, in addition, record the derived quotient on a record card which may be the same control member controlling the computation.

The present application constitutes a division of copending application of Bryce and Dickinson, Serial No. 213,044, filed June 10, 1938.

Certain features of the dividing mechanism per se, and place limiting mechanism shown herein are shown and claimed in application Serial No. 284,188, filed July 13, 1939, which is also a division of application Serial No. 213,044, filed June 10, 1938.

The claims of the present application relate to features in a dividing machine for effecting rounding off operations.

The present improvements relate, particularly, to "rounding off" devices which are also known as "½ cent pick-up," especially applied to dividing machines where a varying number of quotient digits are derived, depending upon certain controls which are established for the machine.

While the quotient digit obtained in a particular order is of material consequence, it is frequently desirable that this particular order be corrected by a unit and accordingly it is an object of the present invention to provide a rounding off mechanism which will automatically add an increment of 5, so as to increase by a unit the order receiving the final digit of the computation.

It is the main object of the present invention to provide means to modify the quotient digit limiting device to cause the quotient computing mechanism to go through an additional quotient digit computing operation over that selected by the prior established quotient digit limiting device. The effect of this is to cause the computation of an additional quotient digit which is augmented by the invariable entry of 5 in such order, thereby correcting the next order to the left and which is the particular order which is of concern in the calculation.

In the dividing machine herein disclosed, one of the controls which may be established for the machine for limiting the number of quotient digits derived is a plugboard control which fixes the number of quotient digits which are to be obtained. The machine further provides for recording of such quotient digits with regard to the decimal point, the place of recording being determined and controlled by the denominational magnitude of the dividend and divisor.

The present invention includes a novel mechanism for modifying the plugboard control which limits the number of quotient digit computing operations so that the additional computing operation will not only be effected but there will be a rounding off operation to correct the calculated quotient digit in the final place. From what has been said, it will be obvious that in such forms of calculation the rounding off is invariably applied to the final order of the quotient amount.

A further object of the present invention is to provide for the recording of quotients to a predetermined number of places and also the utilization of the rounding off mechanism so that the correction will be applied at the fixed and final quotient place. With the present embodiment, the correction is applied to the fixed quotient place which is the same for a series of like computing operations.

In connection with the above, a subordinate object of the present invention is to modify the computing controls of the machine so that an additional quotient digit will be derived over that which is determined by the denominational magnitude of the divisor and arranged to obtain correction of quotient digits at the selected quotient place. This additional computation is preferably carried out so that the increment of 5 may be applied for rounding off the quotient digit at the selected place.

It will be evident from the above that the additional computing operations which are carried out will cause the entry in the lowest denominational order of the quotient receiving accumulator of the additional quotient digit which is augmented by the entry of the increment of 5 to thereby round off the next order to the left. This lowest order of the quotient receiving accumulator will, after the entry of the increment of 5 and the last quotient digit derived, represent a digit which has no particular meaning. Quotient recording operations are normally effected under control of such accumulator and it is a further object of the present invention to modify the readout relation between the quotient accumulator and the result recording mechanism, whereby the amount in the order of the accumulator which is augmented by "5" may be prevented from being recorded and instead a zero recorded in such order.

Further and other objects of the present invention will be hereinafter set forth in the accompanying specification and claims and shown in the drawings which show by way of illustration a preferred embodiment and the principle thereof and what we now consider to be the best mode in which we have contemplated applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together with Fig. 1a to the right of Fig. 1, show the somewhat diagrammatic view of the various units of the machine and the drive therefor;

Fig. 2 is a detail sectional view of the accumulator taken along the dividing line between two adjacent denominational orders of such accumulator or entry receiving devices;

Fig. 3 shows certain parts of Fig. 2 in a different position;

Fig. 7 is another fragmentary sectional view of the accumulator unit of Fig. 2, the view being taken substantially along line 7—7 of Fig. 2 looking in the direction of the arrows. This view in particular shows the readout structure in cross-section;

Fig. 8 is an elevational outside rear view of the accumulator unit of Fig. 2, the view being taken from the left of Fig. 2, looking to the right;

Fig. 11 is a somewhat diagrammatic view showing the card handling and sensing section of the machine. The card handling section is shown diagrammatically in Fig. 1a;

Fig. 19 is a cam timing diagram showing the timing of the various CC cams;

Fig. 20 is a cam timing diagram of the FC cams; and Fig. 21 is a cam timing diagram of the XC cams;

Figs. 22a, 22b, 22c, 22d, 22e, 22f, 22g and 22h, taken together, show the complete circuit diagram of the machine. In arranging these figures, Figs. 22a to 22d are arranged vertically in the order named with Fig. 22a at the top. Figs. 22e to 22h are also arranged vertically in the order named with Fig. 22e at the top and such figures are placed to the right of Figs. 22a to 22d respectively.

Figure 23:
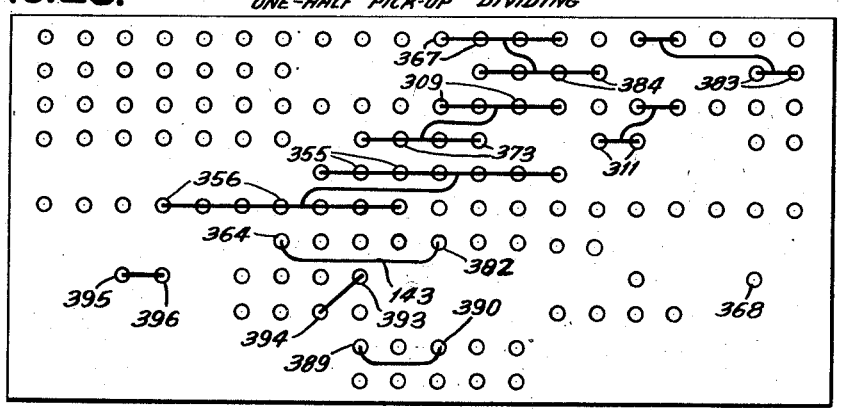
Figure 24:
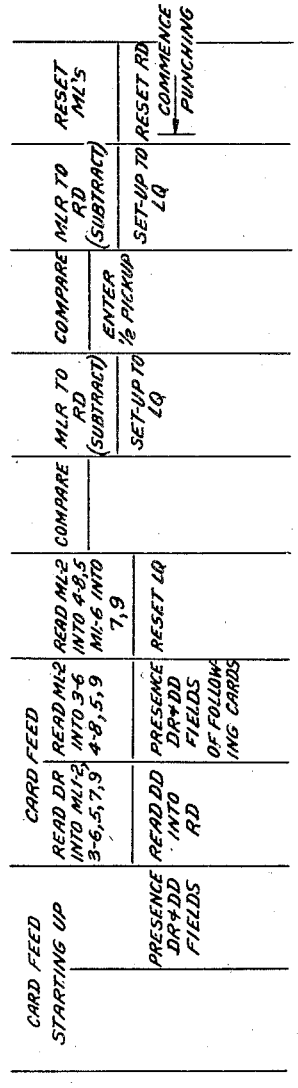

Fig. 23 shows the plugging on the insertible plugboard for the calculation which the machine is adapted to perform;

Fig. 24 is a sequence of operation diagram for a typical calculation which the machine is adapted to perform. This diagram shows the successive cycles of operation for the typical computation.

Figure 25:
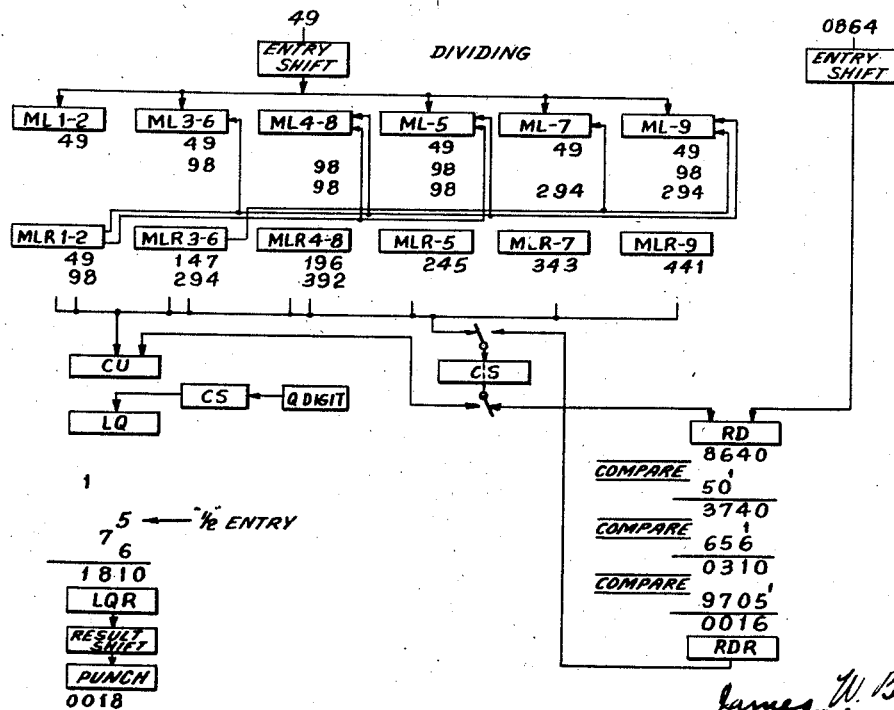

Fig. 25 shows a flow diagram of a typical computation as performed by the machine. The diagram shows an illustrated problem in the manner of effecting entry into the various receiving devices and how the machine performs a typical computation.

Machine drive

Figure 1:
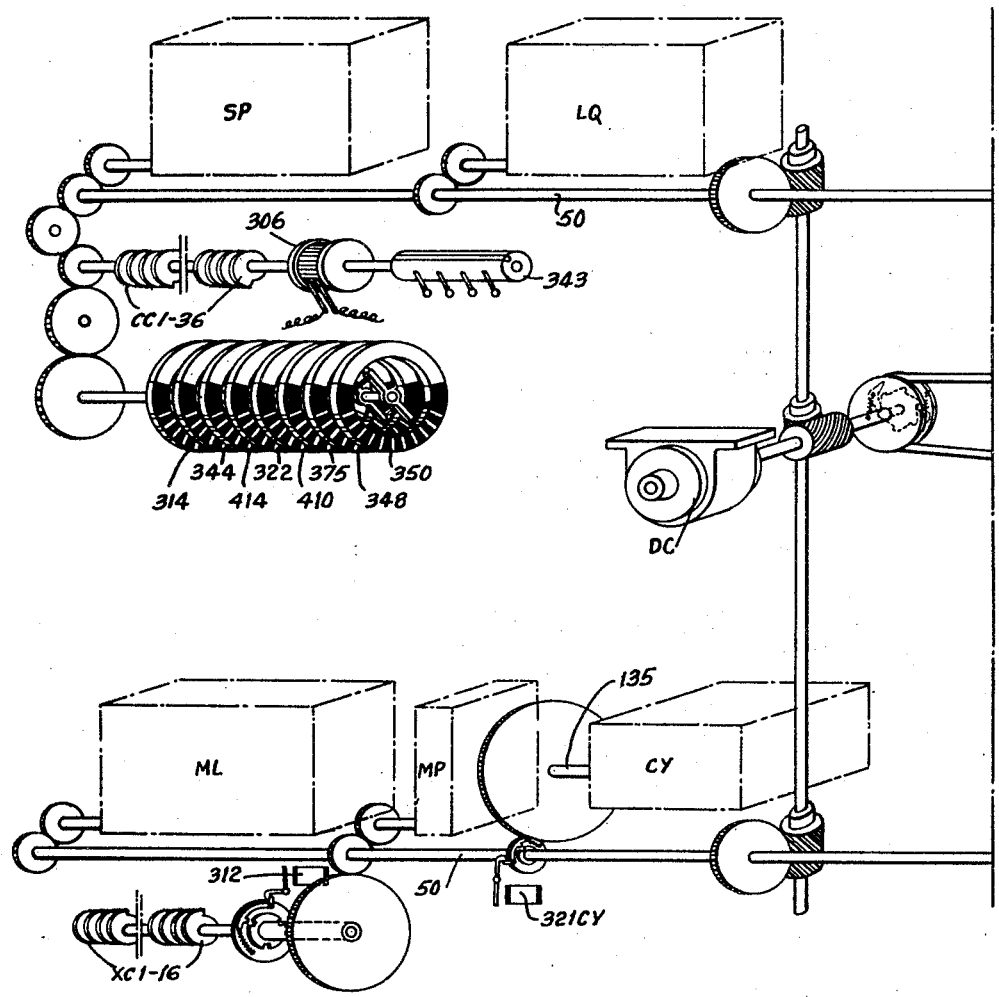

Referring first to Figs. 1 and 1a, in general the machine comprises five accumulating units which are respectively designated SP, LQ, RD, ML and MP. It may be explained that the unit ML contains accumulators and readouts from which all of the nine digital multiples of the divisor can be derived when the machine is used for division. The accumulating units LQ and RD, respectively, receive the quotient amount and the dividend amount. The SP unit is utilized on checking computations. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts are also driven in the customary manner in synchronism with the drive of the card handling section of the machine. The units designated N—R and TT are electromechanical relay setup units of the general construction shown in Figs. 16 and 17. Each of these units is adapted for reset from the constantly running drive shaft by the customary one revolution clutch arrangement. The reset magnets for the units are respectively designated 321N—R and 321TT. The comparing units are shown diagrammatically at CU—CU. These comparing units are of the form shown in Figs. 12 to 15 inclusive and such units are adapted to be driven from the drive shaft by the use of the well known one revolution clutch, the clutch magnet being designated 342.

Also driven from the main drive shaft are the usual CC cams, designated CC1—36, and an impulse distributor 306, a constantly running commutator 343 and in addition there are also provided eight impulse emitters which are designated 314, 344, 414, 322, 410, 375, 348 and 350.

Referring now to the XC1—16 cam contacts, such cam contacts are driven from the drive shaft through a one revolution clutch which is controlled by magnet 312. The driven side of the one revolution clutch receives its drive from the main drive shaft through the gearing shown, which drives one of the XC1—16 cams one revolution for each three revolutions of the main drive shaft.

For clarity and subsequent description, the upper and lower drive shafts will be given a like reference numeral 50.

*Accumulators and entry receiving devices*

As stated, the SP, LQ, RD, ML and MP units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff application Serial No. 182,402, filed December 30, 1937. This accumulator will now be briefly described.

In lieu of driving the accumulator by the customary jaw clutch, the present accumulator which is shown in Figs. 2 to 10 inclusive, is of the form in which a magnetic clutch is used for driving the accumulator element. Suitable circuit making and breaking devices are provided to enable the differential clutch action to take place at a different time of the cycle depending upon the time of sensing. These devices cause the magnetic clutch to remain in action until a definite point in the cycle whereby definite amounts of rotation of the accumulating wheel are obtained in accordance with the initiating differential impulse.

Figure 10:
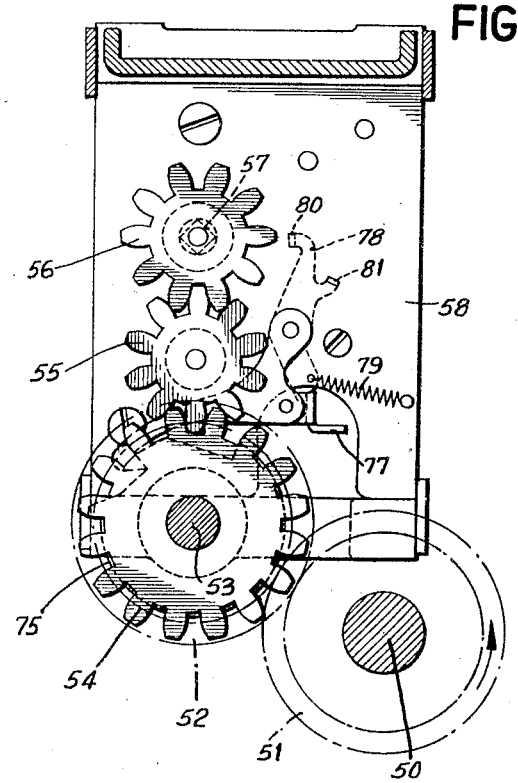
Fig. 10 is an outside view of the accumulator, viz. the view taken from the right of Fig. 8 and looking to the left and which view shows the gear drive for the accumulator unit.
Figure 9:
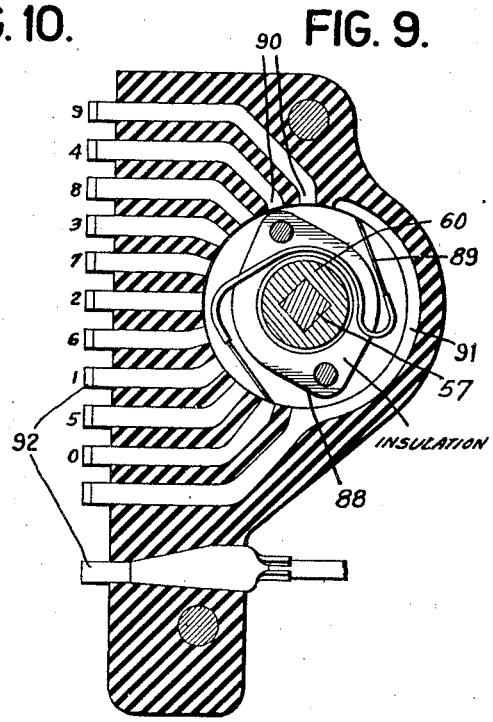
Fig. 9 is a detail view of the readout commutators and wiring to the plug prongs, the section is taken substantially on line 9—9 of Fig. 8.

Referring to Fig. 10, 50 is the drive shaft which is in constant rotation. This drive shaft through suitable gears such as 51 and 52 drives an accumulator drive shaft 53. Shaft 53 carries a gear 54 which through an idler 55 drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Carried about the periphery of yoke 61 and insulated therefrom and from each other there are a pair of channel shaped collector rings 62 to each of which is connected one end of a magnet winding 313 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66. The wheel and cam are riveted together as indicated in Fig. 7 and the rivet fastenings also afford driving means for the readout brush holders. Such parts are mounted for free rotation on the bushing 60. As shown there is a slight air gap between the end of the yoke 61 and the carry cam 66. Wheel 65 is provided with ten teeth (see Figs. 3 and 4), between two of which when the wheel is at rest there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commences to rotate therewith.

Energization of the clutch magnet is afforded by the usual differentially timed impulse which may be received from the sensing section of the machine or from other controls affording an initiating timed impulse. As the wheel 65 commences to turn the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67 when rocked by a tooth shifts an insulated link 71 shifting a contact member 72 to the position shown in Fig. 3. When in this position a circuit is completed through the forked member and a contact spot 73. This establishes a holding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount that the wheel 65 is rotated is dependent upon the differential time of receiving an impulse. De-clutching action at a fixed time in the cycle is brought about as follows: On shaft 53 there is a cam 75 with which a follower 76 co-operates. The follower is integral with a bail 77 which extends across a plurality of units of different denominational orders. For each order there is a lever 78 pivoted on rod 68 and having a lower tail portion bearing against the bail 77 (see Figs. 2, 3 and 4). Each lever is provided with a spring 79 which urges the follower 76 against its cam 75. Each lever 78 has lateral extensions 80 and 81, the former lying in the plane of the wheel 65 and the latter extending behind lever 67.

Figure 4:
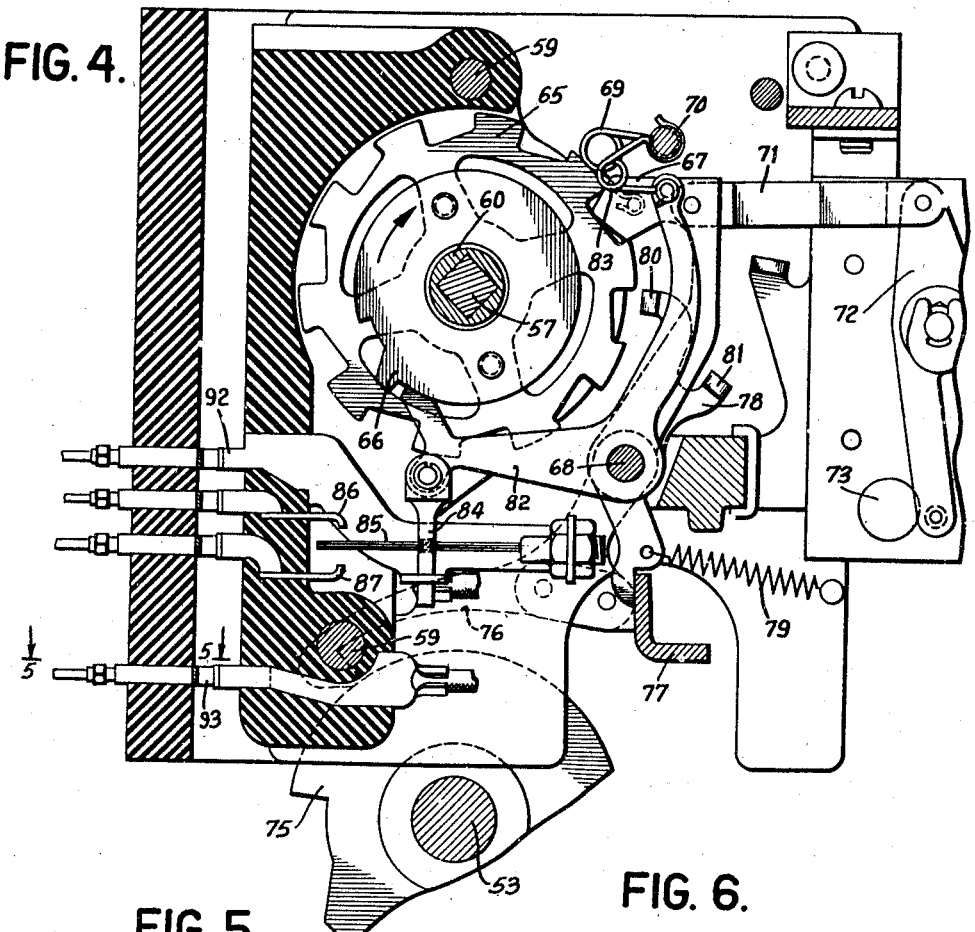
Fig. 4 is another sectional view of one of the accumulator units, the view being generally similar to Fig. 2, but taken on a somewhat different vertical plane.
Figure 5:
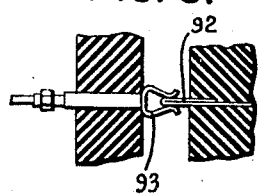
Fig. 5 is a detail view taken substantially along line 5—5 of Fig. 4.
Figure 6:
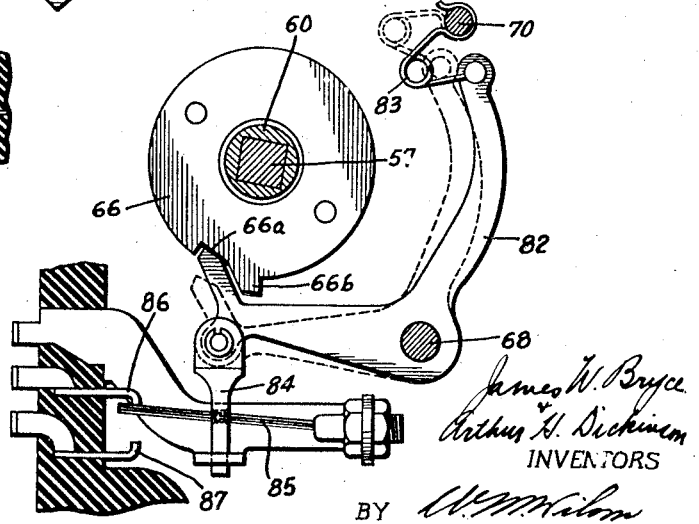
Fig. 6 is a detail view of the tens transfer or carry cam and related parts.

The operation is such that during the entering period of the cycle the follower 76 rides on the intermediate concentric portion of cam 75 holding bail 77 and through it the lever 78 in the position shown in Figs. 3 and 4. At the zero index point in the cycle the follower 76 drops off the cam and the bail 77 allows the lever 78 to rock rapidly in a counterclockwise direction bringing projection 80 into the space between two of the teeth of the wheel 65. At the same time projection 81 engages the lever 67 swinging it back from the position of Fig. 3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted projection 80 will engage the leading edge of a tooth on the wheel 65 and positively interrupt further rotation of the now released accumulating wheel. At the same time the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

*Carry mechanism*

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0" rise 66b on cam 66 will rock the lever 82 to its dotted line position in which position spring 83 will now hold it since the point connection between the spring 83 and the lever 82 is now to the left of the line between centers 70 and 68. As a result the brush 85 is shifted to engage contact 87 and will remain in such position until after the carry portion of the cycle when the high portion 75e of cam 75 will cause lever 76 to rock lever 82 back to the position of Fig. 4.

*Readout structure*

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove it will be understood conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown zero segment 90 is connected with the common segment 91.

The segments 90 and 91 as well as the circuit to the carry brush 85 terminate in beveled contacts 92 (see also Fig. 5) so that ready connection can be made to the unit by means of the bifurcated blades 93.

*Comparing units*

The comparing units of the present machine are of the form more fully described in the co-pending United States application of Ralph E. Page, Serial No. 117,493, filed December 24, 1936. As shown in Fig. 1a, two comparing units are illustrated, each designated CU. These comparing units receive their drive through the one revolution clutch 342 from the drive shaft 50. Upon energization of the clutch magnet 342 the shafting and gearing generally designated 94 is caused to rotate through one complete revolution. It may be explained that for dividing calculations the comparing unit drive is maintained in constant motion. Such comparing unit is wholly disconnected upon multiplying calculations.

Figure 13:
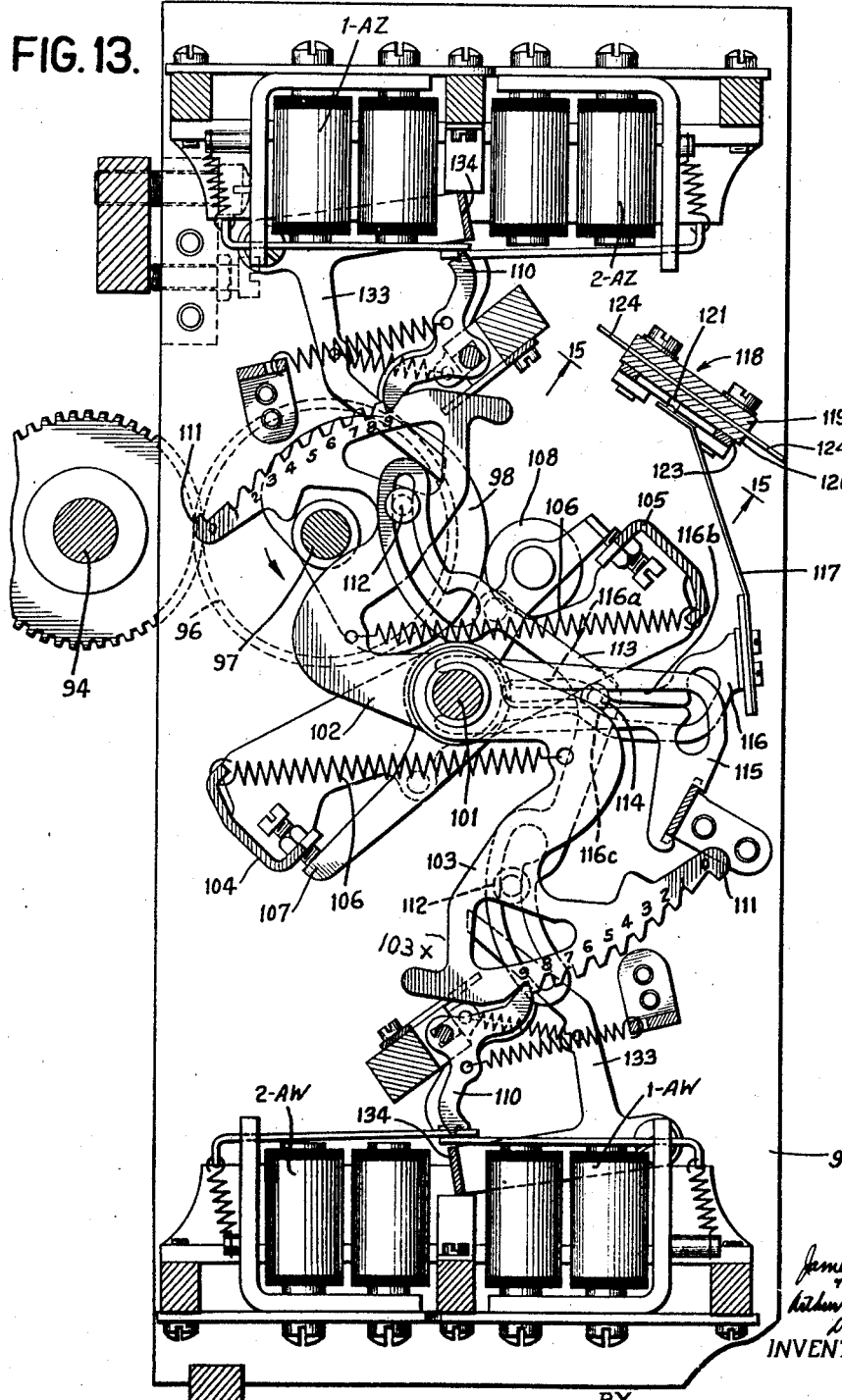
Fig. 13 is a detail sectional view of the parts for one order of a comparing unit, the section being taken along line 13—13 of Fig. 12.
Figure 12:
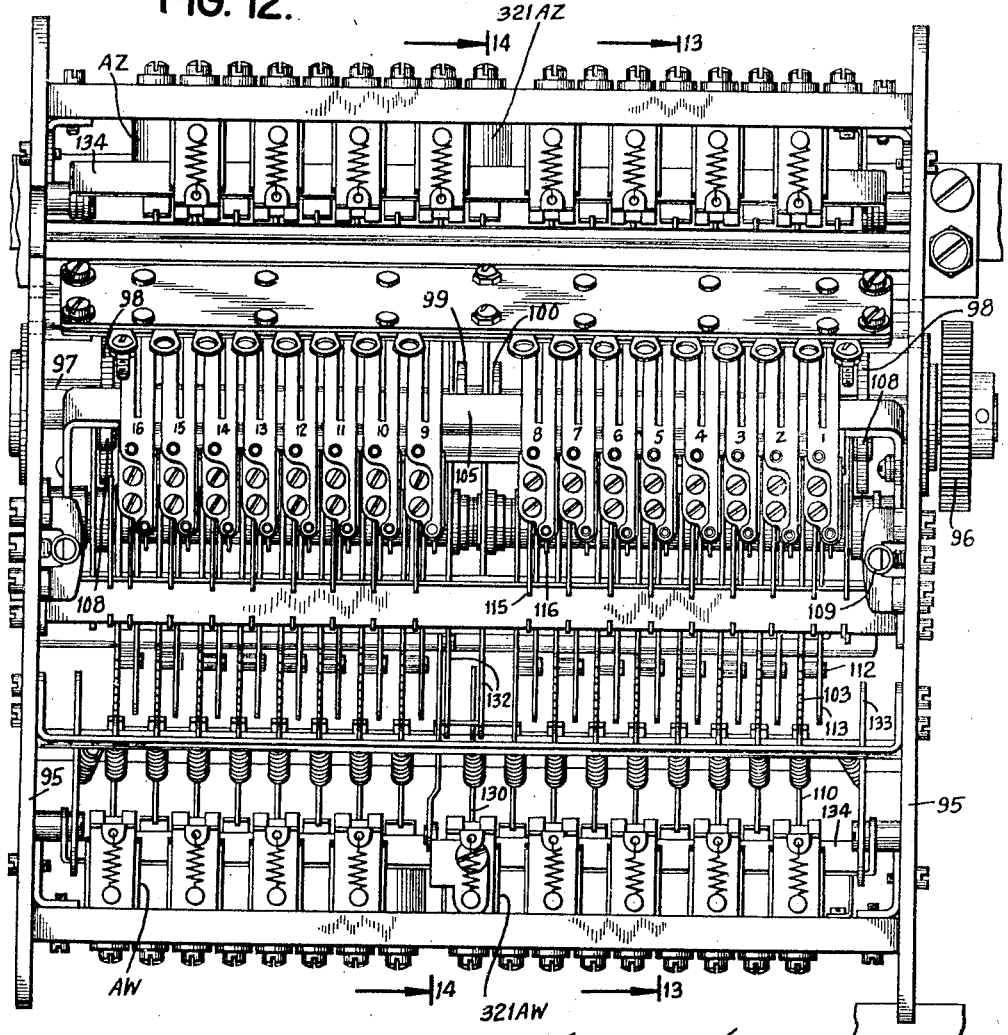
Fig. 12 is a rear elevational view of one of the so-called comparing units of the machine.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross-shaft 101 on which are pivotally mounted in interspersed relation two series of sectors, one of which is designated 102 and the other of which is designated 103 in Fig. 13. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106. The bail 104 projects through the planes of the sectors 132 and is connected to the sectors by means of the springs 106 which tend to hold the surfaces 103x of the sectors in abutting engagement with the bail 104. Similar abutting engagement is provided for between sectors 102 and bail 105. In Fig. 13 the sectors are shown arrested and the bails have moved away from the sectors. Initially and during the bail and sector movement until the sectors are arrested by the stop pawls the sectors abut and maintain contact with the bails. This mechanism is more fully described in British Patent No. 523,652.

Figure 14:
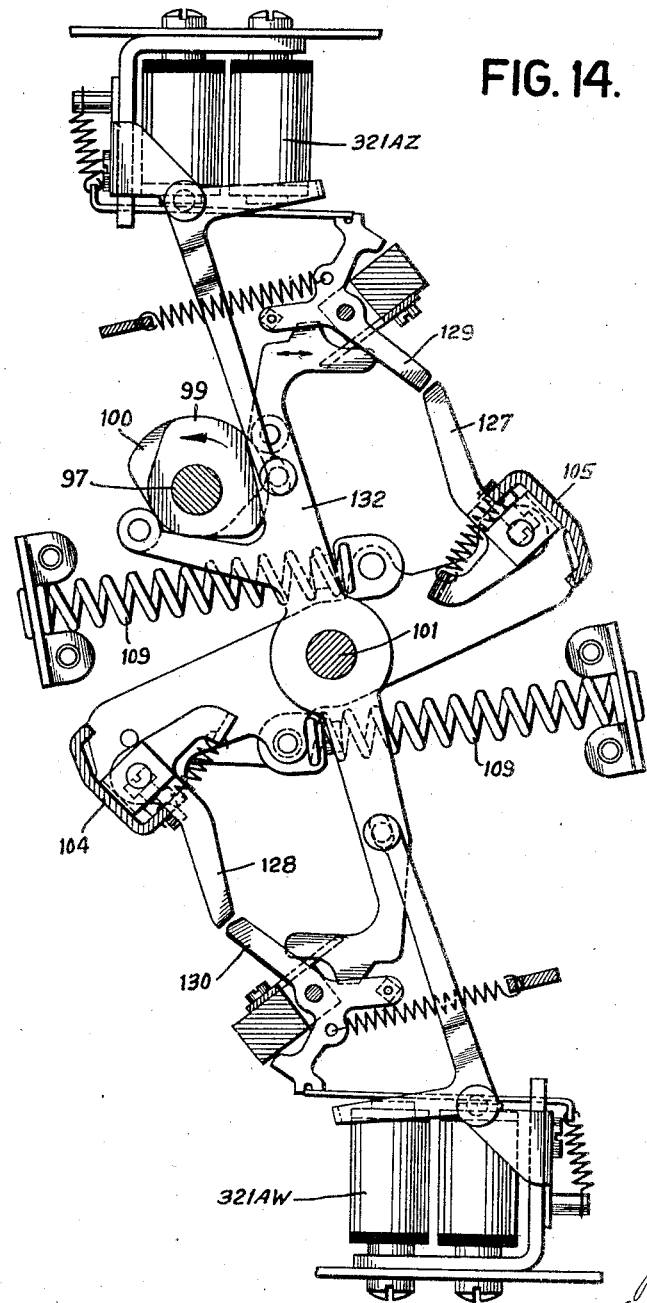
Fig. 14 is another detail sectional view of certain parts of the comparing unit, the section being taken substantially on line 14—14 of Fig. 12, looking in the direction of the arrows.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2—AW and 1—AW are adapted to control two adjacent sectors one of which is behind the other.

Upon energization of a comparing magnet such as 1—AW at a differential time its armature will release the stop pawl 110 which will swing under the influence of its spring to engage the sector ratchet and differentially stop it in a position corresponding to the differential time at which an impulse is received to energize the comparing magnet. In Fig. 13, the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example at the "9" index point position as shown in Fig. 13, the pin 114 will remain at the center in the sloping cam portion 116c. Under this condition there will be no movement of the arm 116. On the other hand when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit it is possible to compare two numbers in a given order and to get three selective settings of 116. One setting is made when the numbers are equal in which case there is no movement imparted to 116, and it remains in the center position. The other conditions are an upward or downward displacement of 116.

Figure 15:
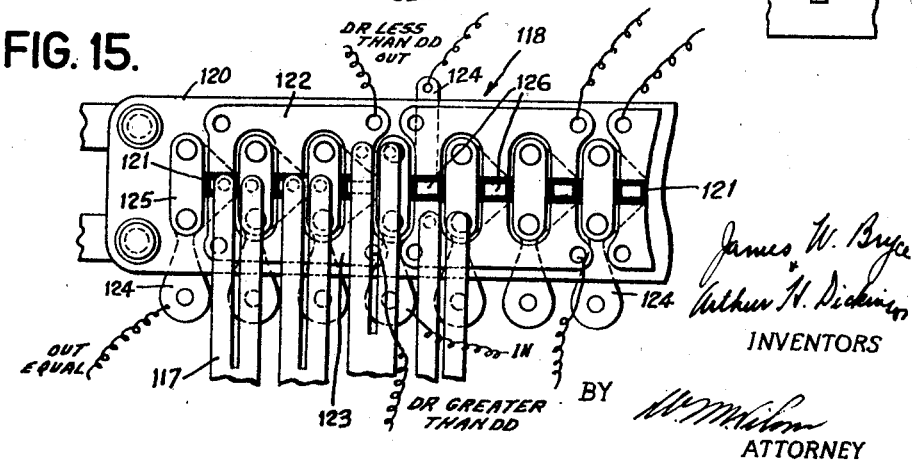
Fig. 15 is a fragmentary detail view of the comparing commutator and brush devices of the comparing unit, the view being taken substantially on line 15—15 of Fig. 13, looking in the direction of the arrows.

It will be understood that in order to provide for comparison of multi-denominational numbers that there are a pair of sectors 102 and 103 for each order and further that there is a member 116 for each order. Each member 116 has secured to it a brush contact bifurcated wiping member 117 (see Fig. 15). In Fig. 15 there are shown four wiping members 117. The two of the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of five orders with five orders. With the setting shown for the five brushes to the extreme left in Fig. 15, the circuit will come in at the wire marked "In" to block 124. It will extend through 125, through the brush 117, thence to plate 122 and out on the circuit labeled "DR less than DD." However, assume that the right hand brush is in the middle position. In this event, the circuit would extend from the "In" wire to contact block 125, through brush 117, through the segment 126 of the next order to the left, thence through contact block 125, through the brush 117 of this order, again through 126 and 125 pertaining to the next orders, through the brushes 117 of these orders, through the block 126 and 125 and out on the "Out equal" wire. On the other hand assume the right hand 117 brush of the five order unit is in down position. The circuit comes in on the "In" wire, through the contact block 125, through the brush 117, and is then completed through the lower serrated member 123 to an out line labeled "DR greater than DD."

With reference to the comparing commutator, it may be explained that the first brush from the right in any group which has moved off from the central or equal position effects the control. For example, assume that the third brush 117 from the left in Fig. 15 is in middle position and the second brush from the left is in upper position, then in that event the circuit would be completed from the "In" line, through the terminal block 124, through block 125, through the brush 117 in say the tens order, through spot 126, through block 125, through brush 117 to contact plate 122 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation certain bail movement controlling mechanisms are provided, which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 104 and 105 the pawls 127 and 128 first yield and ride upon the face of pawls 129 and 130. When the end of the bail movement is reached, the pawls 127 and 128 snap into the position shown, thereafter both bails 104 and 105 will be latched against return movement. If it is desired therefore to retain the setting of an upper sector 102 (Fig. 13) magnet 321AZ (Fig. 14) is left de-energized. So long as this magnet is left de-energized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anti-clockwise direction out of intercepting relation with pawl 128. Accordingly, bail 104 can have an anti-clockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and re-latch the stop pawls 110.

*Electromechanical relay unit*

Referring to Figs. 1 and 1a there are three electromechanical relay units which are generally designated CY, N—R and TT. These units are identical in construction, except for the number of contacts and only one of them will be described. Each unit has a drive shaft 135, the drive shaft is adapted to make one-quarter of a revolution for each revolution of the main drive shaft 50 when the related one revolution clutch (for example that controlled by magnet 321CY, (Fig. 1)) is operated.

Figure 17:
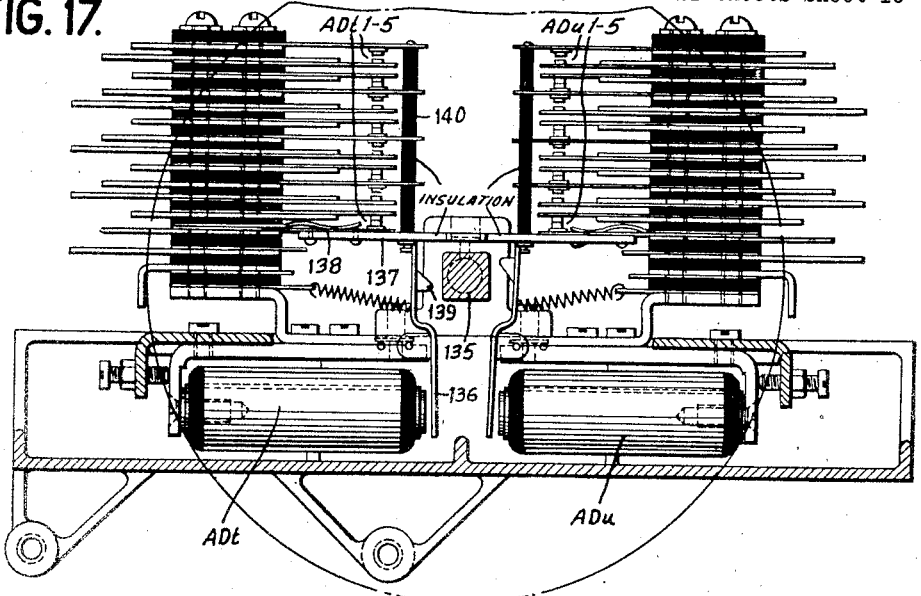
Fig. 17 is a detail sectional view of such unit, the section being taken substantially on line 17—17 of Fig. 16.
Figure 16:
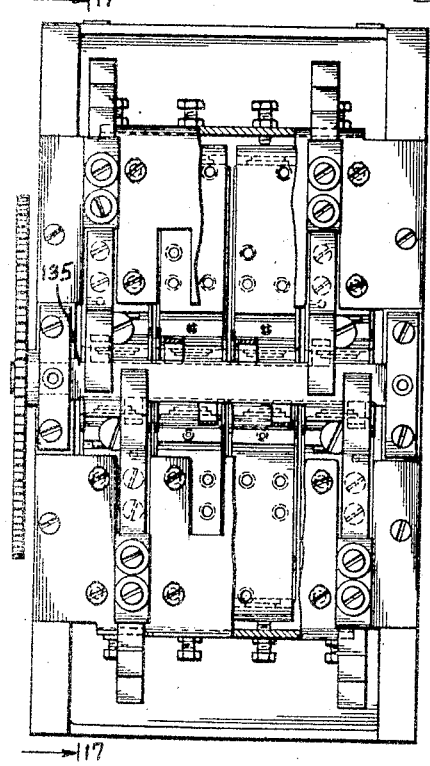
Fig. 16 is a top plan view of an electromechannical multi-contact relay unit which is used in the machine for cycle control and pre-sensing control purposes.

Referring now to Figs. 16 and 17 the shaft 135 is suitably journalled as shown and intermediate the journals the shaft is provided with a square cross-section as clearly shown in Fig. 17. In general the contact operation of this unit is as follows: Each relay unit comprises the required contacts which may include normally closed contacts, transfer or shift contacts and normally open contacts. Each set of contacts has a tripping magnet associated therewith. Such tripping magnets are AD*t* and AD*u*. Upon energization of either of these magnets their contacts will be tripped so that they shift to reverse position from that shown. Such contacts thereafter remain in such shifted position until the shaft 135 makes one-quarter of a revolution, whereupon the contacts are mechanically restored to their initial position. Such contacts are then latched in such position. The rotation of the shaft 135 also mechanically knocks off the armatures and also mechanically restores the contacts to their initial position.

The details of these electromechanical relay units form the subject matter of a copending application of James M. Cunningham, Serial No. 135,503, filed April 7, 1937.

Referring to Fig. 17, AD*t* is one of the tripping magnets. Cooperating therewith is a spring retracted armature 136 which has its upper position in contact with a latch piece riveted to an insulating strip 137 to which the lowermost contact blades are riveted. Suitable springs such as 138 bias the lowermost contacts and the strip 137 downwardly. The insulating strip 137 extends along and overlies the square shaft 135. It will be self-evident that upon energization of a magnet AD*t* related contacts will shift to reverse position and remain in such position. Thereafter, upon one-quarter of a revolution of shaft 135 one square corner of the shaft will first abut the insulating strip 135 and lift it to upper position restoring the contacts and slightly later another corner of the square shaft intercepts a camming element 139 integral with the armature 136 and positively shifts the armature from the magnet into latching position.

The construction is substantially duplicated for the right hand section of the unit. It will be understood that the upper contacts of a set are shifted by insulating members 140.

*Insertable plugboards*

Figure 18:
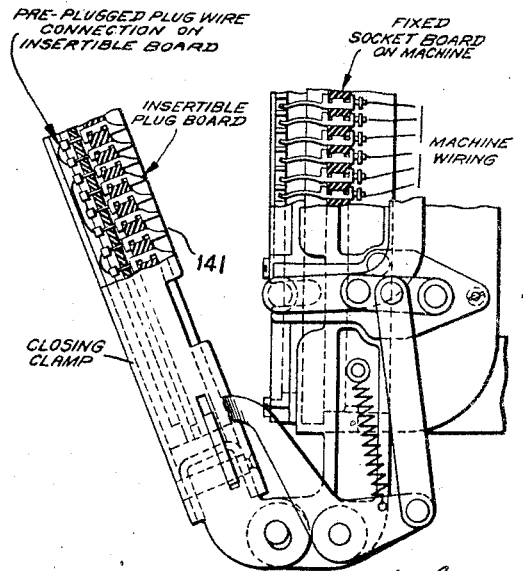
Fig. 18 is a detail view of one of the automatic plugboard units used in the machine, this view showing the plugboard unit in open position.

In order to quickly shift the machine controls from one status in which it is capable of effecting one type of computation use is made of insertable plugboard elements. This insertable plugboard construction is of a type known in the art and the insertable plug unit is generally indicated at 141 in Fig. 18. Devices of this type are generally known as "automatic plugboards" and a suitable form of such board is shown and fully described in the copending application of C. D. Lake, Serial No. 10,299, filed March 9, 1935. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be pre-plugged with a desired set of connections.

It may be explained that the plug socket reference numerals as used on the circuit diagram will have similar reference numerals to those used on the diagrammatic plugboard view on Fig. 23.

*Cam timing diagrams*

The cam timing diagrams, Figs. 19 to 21 inclusive, are self-explanatory. It should be noted that the CC cam contacts make one revolution per machine cycle. The FC cam contacts of Fig. 20 on the other hand make one revolution per card feed cycle, which comprises two machine cycles. The XC contacts of Fig. 21 make one revolution for three machine cycles.

Before describing the details of the circuit diagram and the operation of the machine in detail the general operation for division will be briefly explained.

*Dividing*

When the machine is to be used for dividing, the amount of the dividend and divisor are read from the record. The divisor amount is entered into five accumulative type receiving devices. The amount of the dividend is entered into its receiving device. Following this entry cycle wherein amounts are derived from the record, there is a building up of multiples of the divisor. Before explaining the manner in which these multiples are built up, it may be stated that certain of the entry receiving devices which receive the divisor amounts are provided with so-called "doubling readouts." These doubling readouts are fully described in British Patent No. 456,367. In the machine cycle following the entry cycle twice the amount of the divisor is read out from the readout associated with the ML1—2 accumulator and such doubled divisor amount is entered into ML3—6, ML4—8, ML5 and ML9. On the following machine cycle twice the divisor amount is again read out from the doubling readout of ML1—2 and entered into ML4—8 and ML5. Concurrently and during this same cycle, six times the divisor amount is read out from the doubling readout associated with ML3—6 and such divisor multiple is entered into ML7 and ML9. This completes the building up operation for all digital multiples of the divisor.

It may be mentioned, however, that upon entry of the divisor amount from the record into the receiving accumulators the divisor entry is shifted by a column shift mechanism so that the highest significant digit always appears in the extreme left hand order of the receiving accumulator ML1—2. The dividend amount is also derived from the record and such dividend amount is entered into the RD accumulator. The dividend entry is also made in a manner such that the highest significant digit is entered into the highest order of the accumulator or clear to the left. The purpose of making the divisor and dividend entries in shifted relation is to save operating cycles during the dividing calculations. Control of entry shift for both the divisor and dividend entries is made by pre-sensing each record to ascertain the location of the highest order significant digits of both these amounts. Having ascertained the orders in which such digits of the divisor and dividend occur a selective control is set up and upon entry there is a shift to the left to an extent determined by the control which is set up.

When the machine is effecting division, certain comparing units are utilized. These comparing units are generally of a type described in the copending application of R. E. Page, Serial No. 117,493, filed December 24, 1936. Two of such comparing units having a potential comparing capacity of thirty-two columns are utilized in dividing calculations.

When dividing is to be effected a comparison portion of the dividend, i. e. a determined number of orders thereof to the extreme left, is derived from RDR and such dividend comparison portion is set up in each section of the comparing units. Concurrently and in the same machine cycle with such set up, there is also set up in each of said sections a multiple of the divisor. Different multiples of the divisor are set up on different comparing unit sections. Having set up the comparison portion of the dividend and the different digital multiples of the divisor in this manner, the comparing units proceed and affect a comparison. This comparison is effected in the same cycle in which entries of amounts were made into the comparing unit sections, comparing being instantaneously effected after entry. This comparing operation of the comparing unit sections determines which divisor multiple is greatest in magnitude that is equal to or just less than the comparison portion of the dividend. Having made such determination, a selective control is set up based on the comparison, that is to say, if the 4 divisor multiple is determined to be the greatest going multiple there is a selective control related to 4 set up.

Following the comparing operation the complement of the highest going divisor multiple is read out from its related readout and this complementary amount is entered into the RD accumulator bringing about a deduction of the divisor multiple from the comparison portion of the dividend in such accumulator. Along with this deducting operation the related quotient digit is entered into the quotient receiving accumulator LQ. The same operations are then repeated for a new comparison portion of the dividend. Before comparison is effected, of course, the dividend receiving side or sections of the comparing unit sections are restored to zero in order that a new comparison portion of the dividend may be introduced therein.

The foregoing continues with proper columnar shift after each operation until the dividing computation is completed.

It may be mentioned that the machine is provided with certain place limiting devices and controls to terminate operations when either a certain desired quotient columnar position is reached or to terminate operations when the capacity of the machine is reached.

When dividing operations are completed the machine is ready to record the quotient back on the record. However, in such recording, which is under the control of LQ, there is a relative shift back of the quotient entry on the record. This so termed "shift back" is made under control of devices which are set up according to the original shift of the divisor and dividend upon their entry. The shift back for recording is according to a definite law which will be subsequently explained in detail.

Half-entry feature on division

The machine includes rounding off mechanism to permit the recording of amounts to the nearest one-half. When such mechanism is used, if the machine is set say for a 3 place quotient, the use of the one-half control will cause the machine to compute to one further place in which place a 5 is added, but on final recording there is a discarding of such last place. When the one-half entry has been used on original runs for dividing and when checking is effected of such former runs which involve a one-half entry, the one-half entry is compensated for on the check run by a complementary one-half entry. That is to say, in lieu of adding 5 there is a subtraction of 5, subtraction being effected by complementary addition.

Regular dividing

The operation of the machine will first be explained with reference to regular dividing.

Before describing this operation it may be stated that the circuit diagram of the instant application has been shown with a limited columnar capacity. For simplicity of illustration, the capacity as shown by the circuit diagram is for a mechanism of four columns in the dividend field and two columns in the divisor field. It will be appreciated that in actual practice the machine would have a greater columnar capacity. Greater columnar capacity involves merely a parallel duplication of circuits and relay contacts, etc.

Figure 22B:
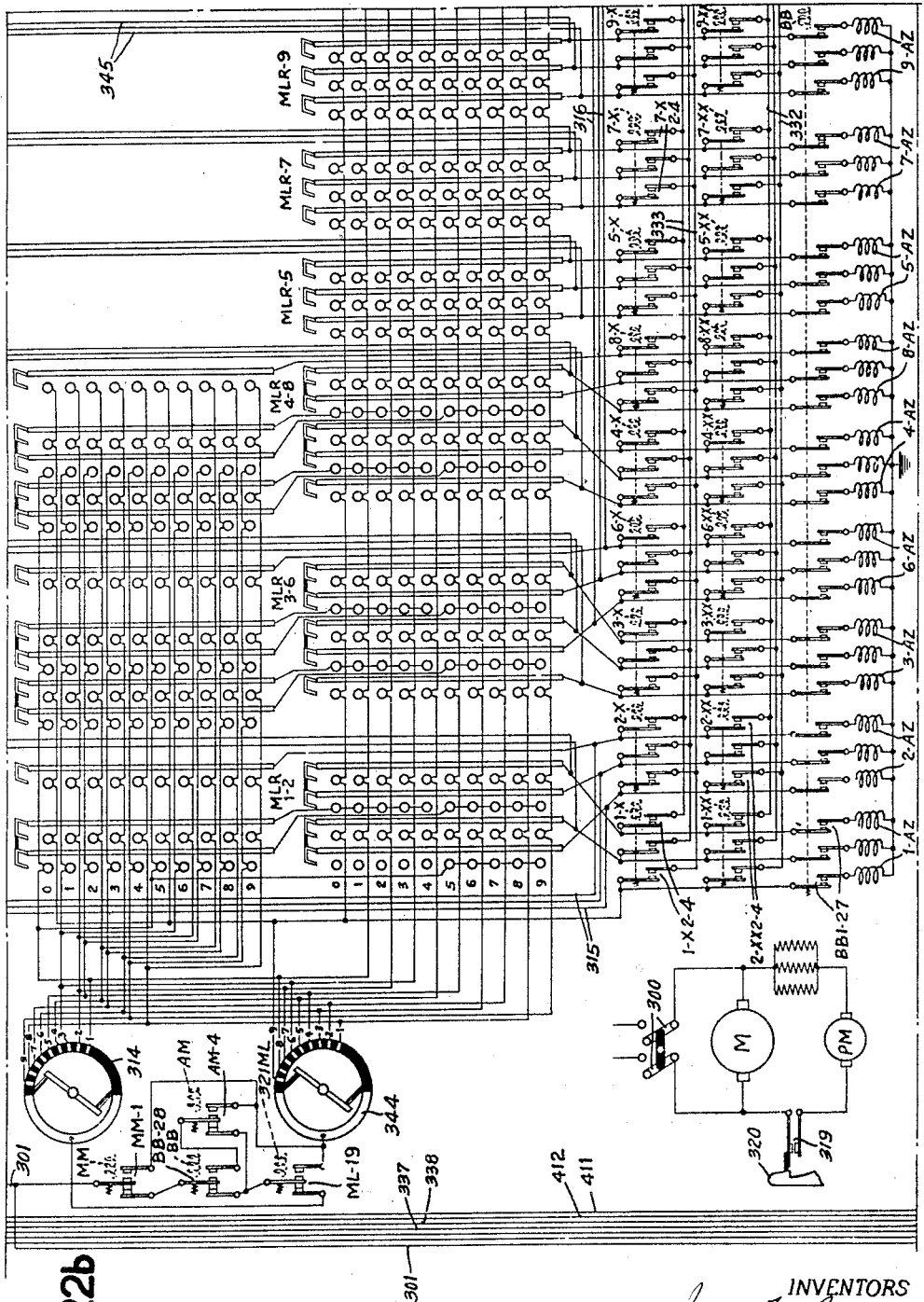

It will be assumed that a set of record cards are in place in the supply magazine of the machine. The operator then closes switch 300, supplying current to driving motor M (Fig. 22*b*). With the main driving motor M in operation the D. C. generator marked "DC" (Fig. 22*d*) is set in operation supplying current to ground and to D. C. line 301. The operator now depresses start key 302 (Fig. 22*d*) and a circuit is completed from ground through to the FC3 contacts through relay contacts F1, through the start key contacts back through relay coil E to line 301. Relay coil E upon being energized is maintained energized by a stick circuit through relay contacts E1 and cam contacts FC2. The energization of relay coil E closes relay contacts E2 and a circuit is completed from ground through relay contacts AJ12 (Fig. 22*h*) through cam contacts CC29, via wire 380 through the punch controlled contacts P1 (Fig. 22*d*) and the E2 contacts now closed, through the JJ2 contacts, through the stop key contacts 303 now closed, through the card feed clutch magnet 304, back through the D1 contacts in the position shown to line 301. A card is now fed by the card feeding and handling section of the machine and is advanced towards the reading brushes in the usual way. In starting up the machine on a run of cards, the start key must be maintained depressed for two card feed cycles or it may be depressed and released and re-depressed.

During initial card feed cycle certain idle operations occur which may be alluded to. Punching does not take place because there is no quotient to record and the card has not reached the punch. Late in the second machine cycle of the card feed cycle the card lever contacts 305 close, bringing about an energization of relay coil G. Energization of relay coil G brings about a closure of relay contacts G1 (Fig. 22*e*) which affords current supply to the FC6 contacts. These contacts upon closure permit current to be supplied to the impulse distributor 306 from which current impulses flow to the card transfer and contact roll 307. The usual regular reading brushes 308 are provided which are connected to plug sockets generally designated 309.

With the present machine, as explained before, special plugboard slides are provided for each computation. The plugboard slide for a regular dividing operation is provided with the plug connections as shown in Fig. 23, in which corresponding reference numerals appear to those on the circuit diagram. This plugboard slide will be pre-wired as shown in Fig. 23 and inserted in the slide holder prior to starting up the machine for a regular dividing operation. A plug connection made between sockets 364 and 382 maintains relay coil AK (Fig. 22*h*) energized throughout dividing computations.

*Pre-sensing and entry shift controls*

Referring to Fig. 1*a*, the setup relay units N—R and TT are provided, which in general construction, are similar to the CY unit previously described and shown in Fig. 17. In the N—R and TT units the tripping magnets are designated N and R with suitable suffixes indicating columnar order and in the TT unit the magnets are designated TT with suitable order suffixes.

It will be understood that these magnets N, R and TT are generally similar to the AD magnets of Fig. 17. Only the N—R unit, however, is used in regular and rate dividing computations.

The insertible plugboard affords plug connections between stockets 383 (Fig. 22*g*) and sockets 367 (Fig. 22*a*) for the divisor field and other plug connections are provided between 384 and 367 for the dividend field.

Figure 11:
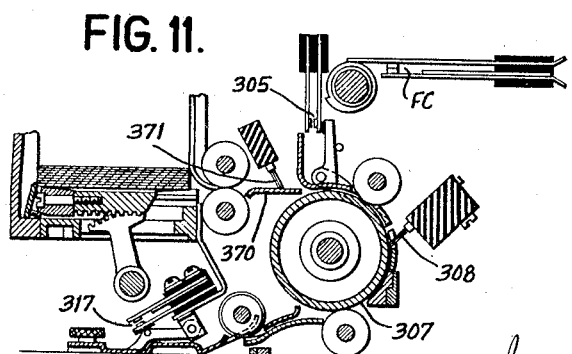

During the card feed cycle when the first card is brought to a position about to be traversed by brushes 308 (Fig. 11) this first card will have traversed the advance pre-sensing brushes 371. The card will finally come to rest with such advance brushes on the "11" index point, but enroute to this point the brushes will have traversed the zero index point position of the card. During such transit the advance brushes presense the presence of zeros to the left of the highest order significant digit of the amount in dividend and divisor fields.

It will be assumed that the machine is performing the division calculation of Fig. 28. With this particular calculation there is a zero to the left of the highest order significant digit, i. e. 8, in the dividend field. Accordingly, on transit of the card past the advance brushes a circuit is established traced as follows: line 301 (Fig. 22*e*), through the G1 contacts now closed, via line 369, through cam contacts FC7 (Fig. 22*a*) which are closed at the time the zero index point of the card passes the pre-sensing brushes, thence to common conductor 370, through one of the brushes 371, through plug connection between socket 367 and the left hand socket 384 (Fig. 22*g*) through the non-shifted AN11 contacts, to and through the N*th* magnet and back to ground. It will be understood that if there was a zero or zeroes before the highest order significant digit in the divisor field one or more of the R magnets would be energized. With the N*th* magnet energized, the contacts controlled thereby in the relay unit are tripped to reverse position from that shown on the diagram.

Upon re-depression or maintained depression of the start key and with relay coil G energized in the manner previously explained, relay contacts G4 (Fig. 22*d*) will become closed and a circuit will be established not only to the card feed clutch magnet 304 in the manner previously traced, but a branch circuit will be established through the AT1 contacts now in the position shown, through the now closed G4 contacts through the now closed AL2 contacts to a supplemental clutch magnet 312. This supplemental clutch magnet releases for rotation the group of XC cams which, upon release, function for three machine cycles.

Figure 22D:
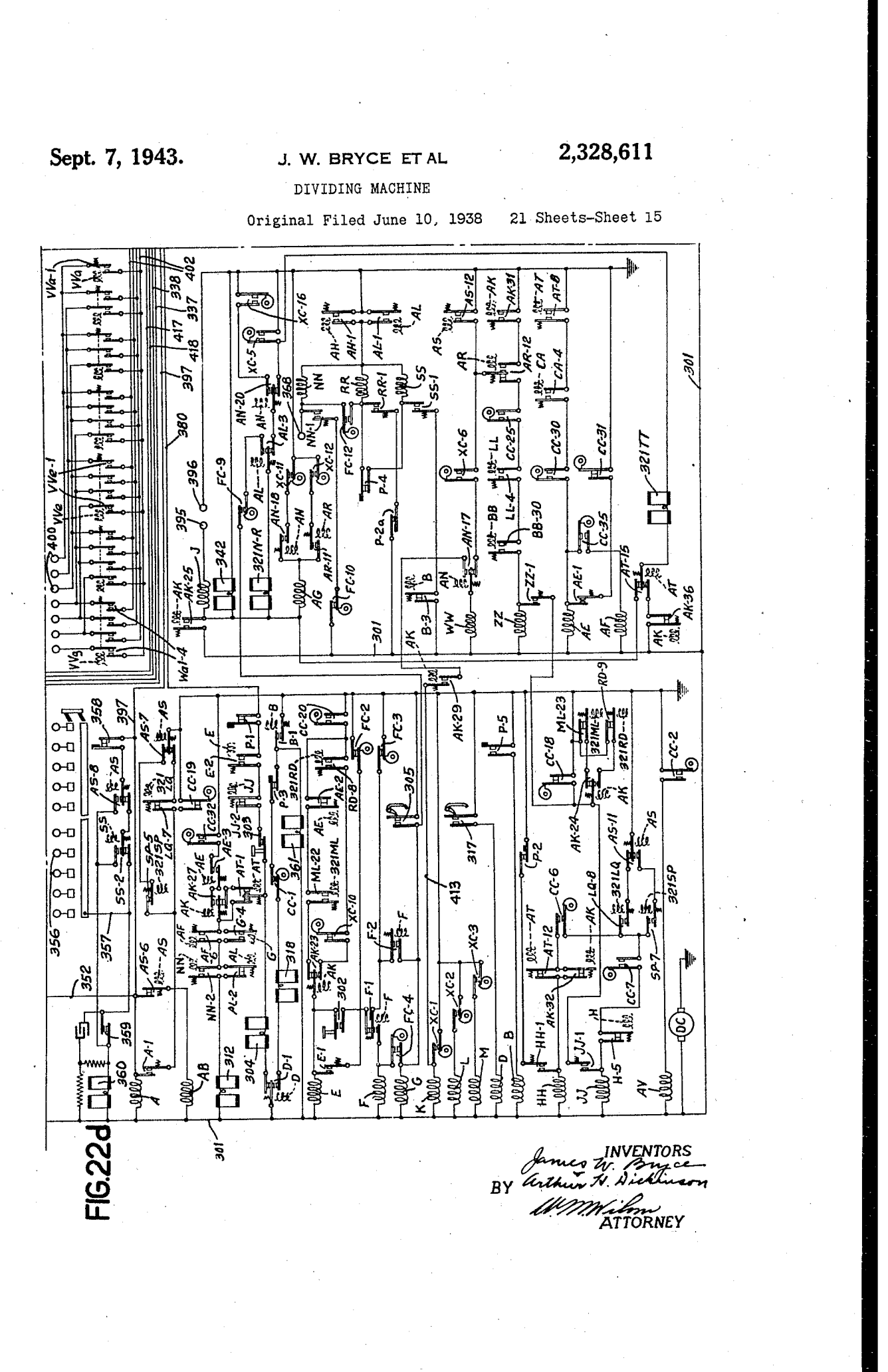

During this second card feed cycle, relay coil G causes closure of contacts G2 (Fig. 22*c*). Current flows from ground through the now closed G2 contacts, through cam contacts FC11, through either contacts NN5 or contacts AH2 in closed position, through relay contacts AL6 in the position shown, through AR2 contacts in the position shown, through the Rt1 contacts now in the position shown, through the relay coil Tt and back to line 301. The energization of coil Tt causes closure of the group of contacts Tt2 (Fig. 22*a*). These contacts remain closed during the entry portion of this feed cycle. Also during the entry portion of this cycle cam contacts XC1 close to energize relay coil K (Fig. 22*d*). With relay coil K energized, the K1—8 contacts (Fig. 22*a*) become closed.

With relay coil Tt energized, the Tt2 contacts (Fig. 22a) close and permit entry of the divisor amount into the ML devices. This divisor amount is entered through the 311ML plug sockets (Fig. 22a), through the AG5—8 contacts, through the Tt2 contacts now in closed position, down through the now closed K1—8 contacts.

It may be mentioned that with the problem under consideration (Fig. 25) there is no shift of the divisor on entry. Assume, for example, that in place of 49 as the divisor that the divisor was 09. In this event magnet Rt (Fig. 22g) would be energized. With Rt energized contacts Rt1 (Fig. 22c) will be tripped to reverse position from that shown. Accordingly, in place of energizing relay coil Tt relay coil Tu would be energized. Such relay energization would be during the card analyzing cycle. Now referring to Fig. 22a with relay coil Tu energized the Tu2 contacts would be closed and if the entry circuit from these contacts be traced it will be noted that the 9 amount, in place of being routed to the units order 313ML1—2 accumulator magnet, would be routed to the tens order of such accumulator. The 9 likewise would also be routed to the tens order of the other multiple receiving accumulators which receive the amount direct from the card upon the entry cycle.

The amount of the divisor is entered into the following multiple receiving devices ML1—2, ML3—6, ML5, ML7 and ML9. On the circuit diagram the prefix reference numeral 313 refers to the accumulator magnets of these multiple receiving devices. These receiving devices are in the form of electrically controlled accumulators with electrical readouts. The ML1—2, ML3—6, ML4—8 receiving devices are provided with doubling readouts in addition to the usual straight readouts. The other multiple receiving devices are provided with straight readouts only. On the entry portion of the feed cycle, the amount of the divisor is entered into five of the multiple receiving devices concurrently.

*Building up of multiples*

On the machine cycle following the entry cycle, there occurs the first step in the building up of further multiples. As stated, the ML1—2 device is provided with a doubling readout. This is designated MLR1—2 on Fig. 22b. In this machine cycle cam contacts XC2 (Fig. 22d) close, energizing relay coil L. With the relay coil L energized, relay contacts L1—12 (Fig. 22a) close and current supply is afforded for the adding emitter 314 as follows: from line 301 (Fig. 22b), through contacts MM1, BB28 and ML19 in the position shown, thence to emitter 314. From emitter 314 the impulses flow over to the transverse buses of the doubling section of MLR1—2, down through the piloting section of this readout and out via a group of lines generally designated 315. From these lines the impulses flow down through the L1—12 contacts (Fig. 22a) which are now closed and ultimately reach the ML3—6, ML4—8, ML5 and ML9 accumulators or multiple receiving devices. This operation will have completed the building up of the 3 multiple in ML3—6.

On the following machine cycle, the cam contacts XC3 (Fig. 22d) close, energizing relay coil M and causing closure of contacts M1—2 (Fig. 22a). With the emitter 314 in operation the times 2 multiple of the divisor is read out from MLR1—2 and flows via lines 315 and through the M1—6 contacts to the ML4—8 and the ML5 accumulators. This will have completed the setting of the 4 and 5 multiples on these receiving devices. During the same cycle in which these entries are being made, the 6 multiple of the divisor is read out from the doubling readout section of MLR3—6 and such 6 multiple flows via lines 316 (Figs. 22b, 22f, 22c and 22a), through the M7—12 contacts and finally reaches the ML7 and ML9 receiving devices. This operation will have completed the setting up of the 9 multiple on ML9 and the setting up of the 7 multiple on ML7. The multiple building up operations are now complete.

During the second card feed cycle, the record card from which the factors were read is advanced to the punch tray in the usual manner. Upon reaching this tray, the contacts 317 close (Fig. 22d) to energize relay coil D. The energization of relay coil D shifts relay contacts D1 to a reverse position from that shown cutting off current supply from the card feed clutch magnet 304 and providing current supply for the punch rack trip magnet 318 upon closure of cam contacts CC1 with contacts P3 and relay contacts B1 closed. The relay contacts B1 become closed upon energization of relay coil B upon closure of the customary last column punch contacts P5. With punch rack trip magnet 318 energized, contacts 319 became closed and remain latched closed in the customary manner by latch 320 (Fig. 22b). Current supply is then provided for the punch driving motor PM and endwise card feed occurs in the usual way to feed the card to the first product punching position.

Considering now the entry shift of the dividend amount it has been previously explained that relay coil Nth (Fig. 22g) was energized in the presensing cycle. Such relay when energized trips the Nth1 contacts (Fig. 22c) to a reverse position from that shown. On the cycle when the card is analyzed and the dividend entry is made a circuit is established from ground through the now closed G2 contacts, through FC11, through either of the contacts NN5 or AH2, through the non-shifted NN3 contacts and the AN2 contacts, through the now closed AK11 contacts, to and through the tripped Nth1 contacts, through the non-tripped Nh1 contacts to the Sh relay magnet and back to line 301. Energization of Sh (Fig. 22c) will close the Sh2 contacts and will establish a shifted entry relation for the dividend entry between lines 374 and lines 351a, which lines 351a (see Fig. 22g) ultimately connect to the 351 lines which lead to the 313RD accumulator magnets. By reason of the column shift contacts Sh2 (Fig. 22c) the dividend amount of 864 will be entered as far to the left as possible in the RD accumulator.

Summarizing, the foregoing includes a column shift arrangement between the lines coming from the reading brushes through the plugboard and the lines which lead to the RD accumulator. Selective column shift will be effected according to the number of zeros preceding the highest order significant digit. For example, if in place of one zero there were two zeros preceding the highest order significant digit of the dividend there would be a further column shift, this being effected by closure of the St2 group of contacts.

At this point it may be explained that it is necessary to retain a set up which corresponds to the entry column shift control for controlling final recording operations after the division calculation is complete. Such set up is retained on selected V and W relay coils (Fig. 22c). Relay coil Sh was energized and with such coil energized there will be an energization of Vh which relay is retained energized for controlling shift back upon recording. Likewise relay coil Tt was energized so there is a corresponding energization of Wt which relay is retained energized for controlling recording.

Referring to Fig. 22c before contacts FC11 open a circuit is established from ground through the XC4 contacts, the AN19, AL4, AM5 contacts in the position shown, through the now closed Sh1 contacts, through the AR7 contacts in non-shifted position, through the Vh relay coil, through the AR13 contacts in the position shown, through the now closed AK10 contacts and back to line 301. This will energize relay coil Vh and such coil, upon being energized, closes its stick contacts Vh1, the return circuit being completed to ground through cam contacts FC5 now closed. A branch circuit also extends through the now closed Tt1 contacts, through the non-shifted AN15 contacts to and through the Wt relay coil and back to line through the non-shifted AN21 contacts and the now closed AK10 contacts to line 301. Relay coil Wt once energized is maintained energized through the stick contacts Wt1 and the return circuit extends through the non-shifted A15 contacts and FC5 cam contacts to ground.

It should be mentioned that during the second half of a card feed cycle there is a reset of the N—R setup unit. Late in the first half of the card feed cycle cam contacts XC5 close (Fig. 22d) and a circuit is completed from ground through relay contacts AN20 and AL3, now in position shown, through the reset clutch magnets 321 N—R through the now closed AK25 contacts to line 301. Energization of 321N—R releases the one revolution clutch (see Fig. 1a) so that any previously tripped N1 and R1 contacts may be latched up in order that they may again be tripped near the end of the card feed cycle when pre-sensing of a following record card is effected.

Reset

With relay coils B and D energized in the manner previously explained relay contacts B2 and D2 (Fig. 22e) become closed. Upon closure of cam contacts CC3, current will flow from the 301 line through these contacts, through the relay contacts AK1 now in reverse position, down through the now closed B2 contacts, the HH2 contacts now closed, the D2 contacts now closed and down through the AS9 contacts now in the position shown, to and through the 321LQ reset relay coil to ground. Reset will then be effected of the LQ accumulator.

The present machine employs electric reset and provision is accordingly made to maintain the 321LQ relay coil energized during the reset cycle. This is provided for by stick contacts LQ11, such contacts being in a stick circuit including cam contacts CC5. Upon energization of the LQ relay, contacts LQ8, LQ1—4 (Fig. 22h) and LQ5 (Fig. 22g) shift to reverse position from that shown. With LQ6 (Fig. 22h) in reverse position current supply is afforded to an emitter 322 which is wired in a nines complementary manner to one of the LQR readouts. Complemental impulses representative of the nines complement of the amount standing in LQ flow through the now shifted LQ1—4 contacts, through the set of lines generally designated 323 to the 313LQ accumulator magnets and back to ground (see also Fig. 22g). By thus introducing the nines complement of the amount standing in LQ the accumulator elements are restored to a 9 position. To bring the accumulator to zero from the all 9 position to zero, an elusive 1 is entered in the units order at the carry time in the cycle. This entry is provided through the contacts LQ5 which are closed in the manner previously explained. This impulse is supplied in the following manner: from line 301, through cam contacts CC16, via line 324, through the LQ5 contacts, through the normal carry relay contacts AV27 controlled by relay coil AV (Fig. 22d) down to the units order of the 313LQ magnets. The units order is thus advanced one step and the electric transfer devices of the accumulator cause advance of all the other higher orders one step.

It may be explained that as long as the machine is operating, cam contacts CC2 close once each machine cycle at the carry time in the operation of the accumulators. Such closure of cam contacts CC2 energizes relay coil AV. The energization of coil AV closes contacts AV1—2 (Fig. 22e), AV3—19 (Fig. 22a), AV20—23 and AV24—27 (Fig. 22g) and AV28—31 (Fig. 22c), which are respectively associated with the MP, ML, RD, LQ and SP accumulators. Since coil AV becomes energized once each machine cycle the aforementioned relay contacts thus close at the carry time. The closure of these contacts permits the electric carry devices to be effective for performing carry operations whenever they are required in their related accumulators.

During LQ reset, provision is made to prevent repetition of such reset. This repeat reset preventing means is provided for as follows: During LQ reset, the LQ8 contacts are closed (Fig. 22d). Accordingly, when cam contacts CC6 close, a circuit is provided from ground through the AS11 contacts, in the position shown, through the LQ8 contacts, through CC6, either through relay contacts AK32, or through the AT12 contacts to relay coil HH. Relay coil HH becoming energized, establishes its stick circuit through contacts HH1 and the punch controlled contacts P2 now closed. On Fig. 22e, the relay contacts HH2 open and thus interrupt the reset initiating circuit to 321LQ.

Computing operations of the machine are initiated by LQ reset. From the LQ8 contacts (Fig. 22d) a circuit extends to contacts CC7 and upon closure of these cam contacts relay JJ is energized, relay contacts H5 being now closed. JJ once enerized is maintained energized by a stick circuit extending through contacts JJ1 through the now shifted AK24 contacts, through the reset contacts 321RD and back to ground. Coil JJ is the computing initiating control. Also upon LQ reset the LQ12 contacts (Fig. 22f) are closed. Accordingly, inasmuch as the machine is set for dividing and contacts AK7 are closed, current will be supplied through cam contacts CC17, through AK17, through LQ12 to the divisor reset coils 321AZ in the comparing units, (see Fig. 14). This will release all of the divisor side sectors and allow them to be restored so as to be in position to receive a setting of the divisor multiples thereon.

The machine is now ready to compare the comparison portion of the dividend with all of the divisor multiples. In general this is effected by reading out a comparison portion of the dividend from the RDR device, setting such portion of the dividend up on one side of all sections of the comparing units and at the same time reading out from the multiple readouts the various divisor multiples, each of which multiples becomes set up on one section on the other side of the comparing units. This operation will now be traced on the circuit diagram.

On dividing calculations the comparing units CU are placed in operation. This is effected by maintaining energized the clutch magnet 342 (Figs. 1a and 22d). The circuit for energizing clutch magnet 342 is completed from line 301 through the closed AK25 contacts, through 342 and to ground. The maintained energization of 342 releases a one revolution clutch to place the drive shafts 94 and 97 of the Cu units (Fig. 1a) in timed operation with shaft 50.

A comparing cycle is initiated by the energization of relay coil LL (Fig. 22f) which becomes energized in the following manner. As previously explained, the computing initiating relay JJ was energized upon LQ reset. Energization of such relay closes contacts JJ3 (Fig. 22f). A circuit is completed from line 301 (Fig. 22f) through the now shifted AK9 contacts, through the CC9 contacts and through all of the 9Cu1, 8Cu1, etc., transfer contacts now in the position shown and finally through the 9Cu1 contacts, through the JJ3 contacts now closed, through the LL relay coil and back to ground. LL once energized is provided with a stick circuit extending back to line 301 through stick contacts LL1 and cam contacts CC13. After the foregoing stick circuit is established cam contacts CC14 close and establish a circuit through the non-shifted H7 contacts to energize magnet 340SB of the SB stepping switch. With magnet 340SB energized the switch arms SB of this relay (Fig. 22f, top) are stepped to the first contact position.

Shortly after the switch arms of the stepping relay have advanced to this position, a circuit is completed from line 301, through the H4 contacts now closed, through cam contacts CC8, through the switch arm of the stepping relay, through the CSa column shift relay coil and back to ground. Another circuit is established through the CC11 contacts, through the LL2 contacts now closed, through the stepping relay switch arm, through the BB relay coil and back to ground. A branch circuit is also established to energize relay coil DD. With coils BB and DD energized, they are maintained energized by their respective stick contacts BB29 and DD1, the stick circuit extending back to line through cam contacts CC10.

It may be explained that column shift relay CSa and relay coil DD cooperate to control the readout of the dividend comparison portion from RDR and contacts BB are utilized to control the readout of the various divisor multiples from the MLR readout devices.

The manner in which a comparison portion of the dividend is set up on the comparing units will now be described. It will be understood that the comparison portion of the dividend includes a selected number of columns. The number of columns selected is determined by the CSa relay. Referring to Fig. 22c a circuit is completed from line 301, via wire 347 (see also Fig. 22g) to and through the now shifted DD9 contacts, to an add emitter 348. With such emitter in circuit, impulses are emitted through RDR, through the non-shifted RD1—4 contacts, via a set of lines 385, through the now shifted DD5—8 contacts, through the now closed CSa1—2 contacts, via lines 386, through the shifted DD2—4 contacts, via lines 387 (see also Fig. 22c) and to the dividend side comparing magnets generally designated 1AW, 2AW, etc.

It will be understood that the comparison portion of the dividend is set up in multiple in the comparing units, that is to say, there are nine identical setups, of the comparison portion of the dividend in order that there can be comparing between each setup and nine different divisor multiples. In the typical problem under consideration, the comparison portion of the dividend which was so set up is the amount of 86 (see Fig. 28). The setup of the multiples of the divisor on the other side of the comparing unit sections will now be described.

It has been previously explained how relay coil BB (Fig. 22f) becomes energized. With such relay coil energized all of the contacts BB1—27 (Fig. 22b) become closed. In addition the BB28 contacts shift to a reverse position. Add emitter 314 will be placed in circuit in the following manner: From line 301 to the non-shifted MM1 contacts, through the shifted BB28 contacts, through the non-shifted AM4 and ML19 contacts to the add emitter 314. Such add emitter will emit impulses to and through all of the MLR readout devices and the multiple amounts available on such readouts will be individually transmitted through the now closed BB1—27 contacts, to the various divisor multiple comparing magnets 1AZ, 2AZ, 3AZ, etc. It will be understood that the divisor multiple side of the comparing units will receive settings of the different divisor multiples. The comparing units operate in the manner previously explained to make suitable settings of the brushes upon the comparing commutators.

Having entered both the dividend comparison portion in a multiple manner into the comparing units and having entered the various multiples of the divisor in the other side of such comparing units the brush devices of the comparing units receive their settings, in the manner previously explained, to indicate a greater than, an equal to or a less than condition. As shown in Fig. 22c, the comparing unit commutators are in sections, one section being provided for each multiple.

Referring to Fig. 22c top, it will be noted that the comparing unit commutators are shown as sectionalized one for each multiple. For each section there is an associated relay coil such as 9CU for a 9 multiple, an 8CU for an 8 multiple and so on. The brush action of the comparing devices is adapted to prevent energization of all magnets relating to multiples which are higher than the comparison portion of the dividend and to permit energization of magnets related to multiples equal to or less than the comparison portion of the dividend.

With the problem of Fig. 25, the only magnet which will be energized is relay magnet 1CU. The circuit energizing this magnet is from line 301 (Fig. 22g), via wire 388 (see also Fig. 22c), through cam contacts CC12, relay contacts DD22 now closed, through the commutator associated with 1CU, through contacts AM8 in non-shifted position, through 1CU and back to ground. At this point it may be explained that if the 4 multiple was the selected multiple, the 4CU coil, the 3CU coil, the 2CU coil and the 1CU coil would be energized and all higher number magnets above 4CU would not be energized.

It may be explained that on a comparing cycle which takes a single machine cycle the setup of the comparison portion of the dividend and of all the divisor multiples is made during the first portion of the comparing cycle. Immediately after the setup is made and in the same machine cycle testing is effected. All testing is done concurrently for all multiples.

Referring now to Fig. 22f the energization of relay coil ICU will have shifted relay contacts ICU1 to reverse position from that shown and upon closure of CC9, current flows through contacts ICU1, to and through the IX multiple selecting relay and through the MM relay to ground. The multiple selecting relay IX is maintained energized through stick contacts IX1, the stick circuit extending back to line through CC15. It may be mentioned that this IX relay coil is energized in one cycle just after the commutator test is made and that such relay is maintained energized through a portion of the next cycle to select the 1 multiple which is to be read out from the MLR1 device and which multiple is to be subtracted from the dividend comparison portion. The IX multiple selecting relay also selects a related quotient digit for entry into the quotient receiving device LQ. Relay coil MM is maintained energized as long as the IX coil is maintained energized, being in circuit therewith.

Previously when subtractive entries were made for resetting purposes the elusive 1 which was introduced into the accumulator to bring the all 9 setting of the accumulator wheels to a zero setting was introduced after the complementary entry. In subtracting the divisor multiple, however, the elusive 1 entry is made during a comparing cycle. In this connection it is to be noted that such elusive 1 is only introduced into the RD accumulator in the event that a multiple is to be subtractively introduced into such accumulator in the following cycle. If no such multiple is to be introduced the entry of such elusive 1 in the comparing cycle is suppressed.

At the carry time in the comparing cycle, the carry impulse flows from line 324 (Fig. 22g) through the now closed MM2 contacts, through the AK21 contacts now in shifted position, through the CSa3 contacts now in shifted position, to and through the 313RD accumulator magnet in the hundreds order. It may be explained that the order in which such entry is made is selected under control of coil CSa, in this instance by the CSa3 contacts. Such carry impulse for subsequent steps of the computation will be introduced into other orders.

It has been explained that if there was no going multiple for any given comparison portion of the dividend that no elusive 1 entry would be made. Such entry is suppressed because of the fact that, in the event that no going multiple is found on test none of the X magnets will be energized because none of the 0CU, ICU to 9CU relays will be energized. With no X coil energized there will be no energization of coil MM and accordingly with MM de-energized the MM2 contacts will remain open and no elusive 1 entry can be effected. On a comparing cycle with a relay coil such as ICU energized, the energizing circuit to coil LL (Fig. 22f) will be interrupted, since a shift of contacts ICU1 cut off the circuit.

Unless LL is energized it is impossible to energize the stepping switch magnet SB. All of the SB switch arms remain on their first contact position and inasmuch as contacts LL2 are open, even though cam contacts CC11 close, there will be no energization of either BB or DD. However, relay coil CSa will be energized again under the control of CC8 on the next machine cycle following the above described comparing cycle. Accordingly, the CSa1—2 contacts (Fig. 22g) will be again closed on the following machine cycle after the comparing cycle. In such cycle, the relay MM is maintained energized as explained before. Accordingly, relay contacts MM1 (Fig. 22b) will shift to reverse position from that shown and a circuit will be established from line through the MM1 contacts in shifted position to the subtract emitter 344.

Suh emitter will emit nines complemental impulses through the MLR1 readout only. Impulses flow out of this readout, through the IX2—4 contacts which are maintained closed by the energization of IX during this cycle. Nines complementary impulses representative of the nines complemental of 49, i. e. 50, flow over the lines 333 (Figs. 22b, 22f and 22g), through the contacts DD2—4, in the position shown, over the lines 386, through the now closed CSa1—2 contacts, through the non-shifted DD5—6 contacts and into the proper columnar orders of the RD accumulator energizing the proper of the 313RD magnets. This operation will deduct the amount of 49 from the amount of 86, the comparison portion of the dividend in this accumulator (see Fig. 25). It will be recalled that the elusive 1 entry into this accumulator has been previously made and that the regular transfer mechanism of the accumulator will provide for transfer to higher orders when required.

*Entry of quotient digit*

With the multiple selecting relay coil IX energized a supplemental contact IX5 (Fig. 22g) will be closed. The DD9, the AM2 and the RD6 contacts are now in the position shown and accordingly add emitter 48 is in circuit. A "1" impulse is emitted through the 1 bus of RDR, through the now closed IX5 contact, through the AK22 and CSa4 contacts now closed, through ZZ2 contact in the position shown, to the left hand accumulator magnet of LQ. This will enter the quotient digit of 1 in such accumulator.

On the quotient entering and subtracting cycle, inasmuch as the DD relay coil was not energized, contacts DD22 (Fig. 22c) are in open position. Accordingly, even if CC12 contacts close there will be no energization of any of the CU relays. Accordingly with none of such coils energized the 0CU1, the ICU1, etc., contacts of Fig. 22f remain in the position shown and upon closure of CC9 current supply is afforded through the JJ3 contacts to energize relay coil LL. Relay coil LL when energized will close its stick contacts as before described and there will be another energization of stepping relay coil 340SB under the control of contacts CC14. Accordingly, switch arms of SB will step to the second contact position. After comparison is made with one dividend comparison portion at the time the multiple selecting relays are energized under control of contacts CC9 a supplemental circuit is established through coils 321AW to ground. These coils are the reset coils of the comparing unit pertaining to the comparison portion of the dividend (see Fig. 14). With such coils energized the dividend comparison side of the comparing units becomes restored so that a new dividend comparison portion can be introduced therein. It will be understood that the divisor multiple side of the comparing unit retains the divisor multiples during all deducting and quotient entering operations.

Referring to Fig. 25, the RD accumulator now has standing in it the remainder amount of 3740. There is now to be another comparison operation and with such comparison operation there is a different comparison portion of the dividend which is selected for comparison. In Fig. 25 it will be noted that the first comparison which has been previously described pertains to the two extreme left-hand orders of the dividend and the second comparison pertains to the next three orders. There must, accordingly, be a column shift to take a different comparison portion of the dividend from the RD receiving device.

It has been previously explained how the SB stepping switch was brought to the second contact position. It was also explained that the relay coil LL was energized. With relay coil LL energized relay contacts LL2 (Fig. 22f) are closed and accordingly upon closure of cam contacts CC11 a circuit is completed through a switch arm of the stepping switch to energize relay coil DD. It will be noted that there is no energization of relay coil BB because the second contact of the stepping switch and those thereafter are not wired in circuit to relay coil BB. Accordingly, at this time there is no energization of relay coil BB. With relay coil DD energized, it is maintained energized in the customary manner and following its energization cam contacts CC8 close and a circuit is established to energize column shift coil CSb. It will be noted that relay coil CSa is not now energized since the switch arm of the stepping switch is in the second contact position and out of circuit with CSa. With the coil CSb and relay coil DD energized, their associated contact shift to a reverse position from that shown in the circuit diagram.

Figure 22G:
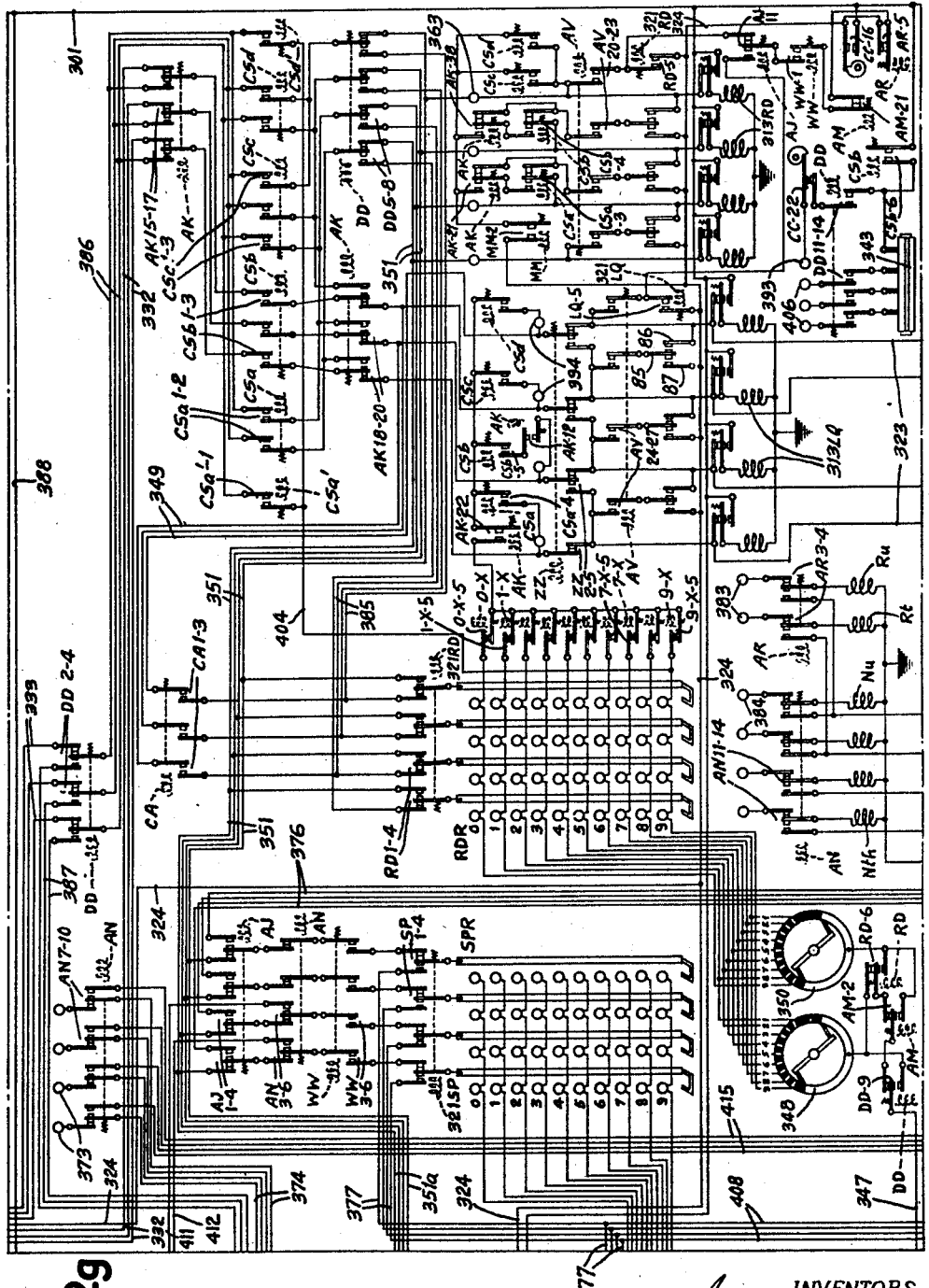

Referring to Fig. 22g with coil CSb energized, contacts CSb1—3 close and there is a new readout relation established with RDR. The readout relation is now such that the three left hand columns of RDR are selected for readout and for controlling the entry into the dividend side of the comparing units. The entry circuit will now be traced. From line 347 (Figs. 22c and 22g), through the DD9 contacts now shifted, to the add emitter 348, from the add emitter impulses are emitted through the three left hand columns of RDR, through the contacts RD1—3 in the position shown, to lines 351, thence through the DD5—7 and AK18—20 contacts now shifted, through the closed CSb1—3 contacts, through the shifted AK15—17 contacts, lines 386, thence through the now shifted DD2—4 contacts, to lines 381, thence to Fig. 22c and to the various 1AW, 2AW, etc., comparing unit magnets. This operation will have set up the new comparison portion of the dividend, viz. 374 in the various comparing units.

It will be recalled that the divisor multiples still remain set up in the divisor side of the comparison units. There is then a further comparison effected and the comparison commutators and circuits of the comparing unit bring about an energization of all of the CU coils from 1CU up to and including 7CU but leaves coils 8CU and 9CU de-energized. With the 7CU comparison relay coil energized, the related relay coil 7X (Fig. 22f) becomes energized under the control of CC9, over the circuit previously described, but which in this instance, is completed through the now shifted 7CU—1 contacts to the multiple selecting relay 7X. When relay coil 7X is energized relay coil MM likewise becomes energized in the manner previously explained. Both 7X and MM are held energized through the 7X—1 stick contacts.

In the comparing cycle and at the carry time in such cycle, provision is made for introducing an elusive 1 into the RD accumulator in the third order from the left. Such elusive 1 entry is made generally in the manner previously explained except that at this time the CSb4 (Fig. 22g) contacts are in shifted position due to the energization of CSb. With relay coil MM energized, the MM2 contacts are closed and a circuit is completed from line 324 at the carry time, through MM2, through the new shifted AK38 contacts, through the now shifted CSb4 contacts, down to and through the tens order 313RD accumulator magnet. This will enter the elusive 1 in such order. On the following cycle the 7 divisor multiple is entered subtractively into the RD accumulator and the 7 quotient digit is entered into the proper columnar order of LQ.

Referring to Fig. 22b energization of the 7X multiple selecting relay coil, brought about as previously explained, will close the 7X2—4 contacts. The energization of relay coil MM will shift MM1 contacts to reverse position and place the nines complementary emitter 344 in circuit with line 301. Nines complementary impulses flow from the 344 emitter, through the MLR7 readout, out through the 7X2—4 contacts to the lines 333 (see also Figs. 22f and 22g), through the non-shifted DD2—4 contacts (DD having now become de-energized), through the shifted AK15—17 contacts, through the shifted CSb1—3 contacts, CSb having been re-energized in such cycle since the stepping relay SB remains on the two contact position, through the AK18—20 contacts now shifted, through the DD5—7 contacts in the position shown, to lines 351, to the three left hand accumulator magnets of the RD accumulator. This will enter the nines complement of the 7 multiple of the divisor into such accumulator. Concurrently with the foregoing deducting operation the 7 quotient digit is entered into RD. The energization of relay coil 7X will have closed contacts 7X5 (Fig. 22g). Add emitter 348 will now be in a circuit which extends through the DD9, AM2, and the RD6 contacts in the position shown. A current impulse will be emitted from the 7 spot of the add emitter 348 to and through the RDR readout and through the closed 7X5 contacts, through the AK22, the CSb5, and the AK12 contacts now closed, down to the hundreds order of accumulator magnet of the LQ accumulator. This will enter the 7 quotient digit in such order of this accumulator.

Referring to Fig. 25, it will be noted that in the typical computation there illustrated, there was a half entry of 5 in the third from the left quotient place. It will be assumed that the calculation being effected does not involve such half entry. The computation then is completed and termination of the computation is to be controlled by the place limiting device which is provided for this purpose.

*Place limiting device*

Referring to Fig. 22f, the insertible plugboard will have provided a plug connection from socket 389 to the second socket 390 from the left. The second socket from the left is plugged up because the computation is to be carried to two quotient places. If the computation was to be carried to further quotient places the third or fourth socket 390 from the left would be plugged up. During the multiple deducting cycle just described, relay coil DD will be de-energized and accordingly the DD22 contacts (Fig. 22c) remain in open position. There will accordingly be no energization of any of the CU relay coils. With none of such relay coils energized, the OCU1 to 9CU1 contacts (Fig. 22f) will remain in the position shown so that upon closure of cam contacts CC9, relay coil LL will become energized. With such relay coil LL energized, the relay contacts LL3 will be closed and upon closure of CC17, the circuit will be completed through LL3, through the switch arm of the stepping switch now still in the second contact position, through the J4 contacts in the position shown, through the plug connection from socket 390 to socket 389 to energize relay coil H. H being energized, closes its stick contacts H1 and the stick circuit is completed back to line through the AK37 contacts now in shifted position and through the RD11 contacts which are in the position shown, to line 301.

The energization of relay coil H will have shifted relay contacts H2 to a reverse position from that shown at a time prior to the closure of cam contacts CC14. Accordingly, with such CC14 contacts closed, a circuit is completed through the stick contacts LL1 of LL, through the CC14 contacts, to the release magnet 341SB of the stepping switch. With this operation, due to the shift of contacts H2, the stepping switch magnet 340SB will be out of circuit. Energization of the 341SB release magnet will release the stepping switch and allow it to return to normal home position, i. e. the position shown in the circuit diagram. It may be mentioned that no circuits are inadvertently established by the switch arms on SB on restoration because on restoration the H4 relay contacts are in open position. The foregoing restoration of the stepping switch and opening of contacts H4 terminates further energization of the CS magnets, the BB or the DD magnets.

The machine has now reached the stage in its operation in which it is ready to record the quotient upon the record. The various ML multiple receiving accumulators can now be reset and the DD device can also be reset. Before recording is effected there must be a change in the readout relation between LQR and the punch, according to the entry shift which was previously made upon entry of the divisor and dividend amounts. Reset of the ML devices is brought about in the following manner. Energization of relay coil H (Fig. 22f) in the manner previously explained will have caused closure of relay contacts H3 (Fig. 22e). Upon closure of CC3, a circuit is established from line 301, through the AK1 contacts now in shifted position, through contacts H3 and AK2 now closed, to line 337.

Line 337 ultimately extends to Fig. 22h and the circuit from such line is completed through the now closed J2 contacts, through the switch arm of the stepping switch SE now in the position shown, back to line 338 which ultimately extends to Fig. 22e. From line 338, the circuit is completed through the now closed AL7 contacts, to and through the 321ML reset relay coil to ground. A branch circuit is also completed from line 338 to the AE5 contacts now in the position shown, through the AK5 contacts now shifted, through the XC9 cam contacts, to and through the 321RD reset relay coil and back to ground. Energization of 321ML and the 321RD reset coils will bring about electric reset of the corresponding accumulators. The detailed reset circuits will not be traced as these have been previously traced. The energization of the 321RD relay also serves to de-energize the computing initiating relay coil JJ as follows: Opening of contacts RD9 (Fig. 22d) breaks the stick circuit for coil JJ, which stick circuit extends to the now shifted AK24 contacts. Actual de-energization of coil JJ is timed by the CC18 cam contacts following the opening of RD9.

On dividing operations, due to a shift in the entry of the divisor and dividend there must be a selected energization of the Z and AA coils. With the computation under consideration the coils which will be energized on dividing are AA$t$ and Z$h$. The selected energization of the Z and AA coils is brought about under control of the pre-sensing control, which pre-sensing control it will be recalled, has effected certain selected energization of W and V relay coils, viz. the W$t$ and V$h$ relay coils in the example under consideration.

The energization of 321RD (Fig. 22e) brought about as previously explained, will have caused closure of contacts RD7 (Fig. 22c). Upon closure of cam contacts CC4, the circuit is established through the now closed RD7 contacts, through the AE6 contacts, through the AS5 contacts, through either of the AT18 or AK35 contacts, through the W$t$2 contacts to energize relay coil AA$t$. There is also an energizing circuit for relay coil Z$h$ through the V$h$2 contacts. It will be recalled that relay coils V$h$ and W$t$ will have been energized under the pre-sensing control previously described to bring about closure of V$h$2 and W$t$2. A branch circuit is also completed through RD7, AE6, to line 352, which circuit extends to Fig. 22d and brings about energization of relay coils A and AB.

All of the relay coils A, AB, AA$t$, Z$h$ will be maintained energized through the A1 stick contacts, the circuit extending back to line through the LQ7 contacts, the AS7 contacts in the position shown, to ground.

Referring to Fig. 22h, it will be noted that there is a column shifting arrangement intermediate plug sockets 355, which are sockets which are connected to the punch readout strip sockets 356 (Fig. 22d) and LQR (Fig. 22h). Such column shifting arrangement is provided by the multi-contacts controlled by the various Z relays and the AA relays. The AA relays are selectively energized according to the entry shift of the divisor upon entry and the Z relay coils are selectively energized according to the entry shift of the dividend upon entry. With relay coils AA$t$ and Z$h$ energized, there will be a closure of the related contacts AA$t$1—7 and Z$h$1—7 and the closure of these contacts in combination will establish a readout relation between LQR and the sockets 335 so that there will be a punching not in the extreme left hand field of the record card, but in a field shifted two columns to the right from the extreme left hand field.

It will be assumed that all of the seven sockets labeled 355 (Fig. 22h bottom) are connected to sockets 356 (Fig. 22d). If the circuits from the two left hand sockets of the 355 group and the extreme right hand 355 sockets are traced it will be found that their circuit extends back to a line 391, which line connects to a line 392 and that this circuit is completed back to line 301, through the now closed AB1 and AB2 contacts to and through the zero interposer magnet 353. This will provide for punching zeros on the record card in columns of the quotient field not controlled by LQR.

Now referring to the third socket from the left of the 355 group, it will be noted that this circuit is completed through the AAt2 contacts, through the Zh4 contacts, to a line which extends up to the thousands order of LQR. Inasmuch as the brush in this order is standing upon 1, the one punch selecting interposer magnet 353 will be energized during the punching operation. If the line from the fourth socket from the left of the 355 sockets be traced, it will be noted that this circuit is completed through the AAt4 contacts, through the Zh5 contacts, through the non-shifted GG1 contacts to the hundreds order of LQR. In this order, the brush is standing on the 7 spot so that the line will be completed through AB9 contact to and through the seven interposer magnets 353.

Referring now to the two sockets 355, which are in the second and third columns from the right of the group, it will be noted that circuits are completed through AAt5—6 and Zh6—7 through the non-shifted FF1 and EE1 contacts to the tens and units orders of LQR. The brushes in these orders stand at zero, therefore there will be a circuit completed from both orders back to the zero interposer punch selecting magnet 353.

The law of operation which the present machine has for controlling shift back upon recording may be expressed by the following formula: The number of columns in which the quotient amount is shifted back to the right upon final recording is determined by the following:

$S_{DD} + (S_{DR} - S_{DR}')$, where $S_{DD}$=the number of positions, the dividend (DD) is shifted to the left upon entry.

This amount of shift may also be taken to be the maximum number of dividend places available in RD less the actual number of dividend places in the dividend amount and where $S_{DR}$ equals the maximum number of available divisor places in the divisor entry receiving divisor places minus one and where $S_{DR}'$ equals the number of columns, the divisor is shifted to the left upon entry. This number of columns may also be taken to be the number of columns the actual divisor is less than the maximum number of available places in the ML entry receiving devices.

Substituting the above values in the formula, we have 1+1—0=2, which is the number of places that the quotient is shifted back to the right upon final recording under the pre-sensing control.

The foregoing description has explained the circuits for selectively reading out amounts to the punch on final recording. Punching occurs successively column by column in the usual way, but it may be mentioned that the return circuit from any plug socket 356 is via the punch read-out brush to the common strip of the readout, thence via wire 357 (Fig. 22d), through the SS2 contacts, the AS8 contacts, the usual escapement contacts 358 of the punch, through the stick contacts A1 and thence back to ground. The energization of any interposer magnets 353 (Fig. 22h) closes the interposer controlled punch magnet contacts 359 (Fig. 22g) and energizes the punch magnet 360 in the usual manner. Punching then proceeds in the usual way column by column and eventually the card reaches the beyond last column position and closes P5 energizing coil B. Energization of B closes contacts B1 and energizes the eject magnet 361 of the punch. Card eject then occurs and contacts P3 and P4 become closed to condition control circuits for a succeeding computation.

It may be explained that with the present embodiment punching operations occur during a cycle in which not only the reset of the ML and the RD devices is effected, but also during a cycle in which feed of a succeeding card is effected. In this way operating time is saved since recording operations are overlapped with resetting and card feeding operations. Heretofore in dividing machines such an overlap has not been attained. Such overlap is afforded with the instant arrangement because of the fact that the quotient is contained in the LQ accumulator which receives no entry from the card on a card handling operation. Furthermore, such LQ accumulator can be subsequently reset after controlling quotient punching.

Card feed of a new card is brought about in the cycle which immediately follows the ML and RD reset cycle and such card feeding operation is initiated during the ML and RD reset cycle in the following manner. Upon energization of 321RD (Fig. 22e) contacts RD8 (Fig. 22d) close and upon closure of cam contacts CC20 a circuit is completed through RD8, XC10, AK23 in shifted position, to and through relay coil E. Coil E is maintained energized by a stick circuit previously described through E1 and FC2. Energization of relay coil E closes relay contacts E2 to condition the circuit for subsequent energization of card feed clutch magnet 304 and the XC clutch magnet 312. Energization of these two magnets occurs upon closure of cam contacts CC29 (Fig. 22h) which complete a circuit in the manner previously explained.

Inasmuch as a new computation is to follow, provision is made to de-energize the previously energized shift control relays V and W (Fig. 22c). Such de-energization is effected in the beginning of the card feed cycle upon opening of cam contacts FC5 which interrupts the stick circuits to any of the V or W relay coils which have been previously energized. This operation will place these relays in condition to be set up again under the pre-sensing control of the next card. Computations proceed card by card until all computations on all cards are complete. Following the computation of the last card while there is an energization of the card feed clutch magnet 304 (Fig. 22d) there will be no energization of the XC clutch magnet 312 in view of the fact that the relay contacts G4 are now open, these being open because coil G is now de-energized, card lever contacts 305 having opened on such last card condition. This prevents unwanted XC cam contact operations.

*Rounding off device*

In calculating machines, particularly multiplying machines rounding off devices have been utilized to carry a particular calculation to the nearest unit in a particular order. This has been accomplished by entering an amount, say 5, in one order to the right of the order which is to be rounded off and which order is the last order to be recorded by punching. In the present machine rounding off mechanism is also employed but supplemental controls have to be provided in connection with such rounding off for the following reason. Let it be assumed that a computation is to be carried to two quotient places only and that the place limiting devices of the machine are set for such two place quotient. However, if the rounding off feature is employed, the 5 increment must be introduced in an order to the right of the last desired quotient place and if such 5 is introduced into such order then the machine must carry the computation further and terminate the computation not in the last desired quotient place, but in a place or order beyond such last desired place. The place limiting control therefore has to be modified to allow the machine to carry the computation one step or order further than is desired for the last quotient place itself. This change of control brings about and makes necessary a further control. In view of the fact that the machine has computed beyond, say, two orders of quotient digits and in view of the fact that it is only desired to record two orders of quotient digits, provision must be made for preventing recording beyond the last significant quotient place and for entering a zero in such order in which recording of remainder digits is not desired.

The foregoing can best be understood by reference to Fig. 25. In Fig. 25, considering the rounding off or one-half entry, the calculation is there shown as being limited to two places of the quotient. The augmented entry of 5 is placed in an order of LQ just to the right of the order which receives the 7 quotient digit entry. The computation is then carried on beyond this order and a 6 quotient digit entry is made in the next column to the right. The 6 added to the 5 gives a result of 11 giving a carryover of one into the next higher order and producing a final quotient amount of 18. There is, however, a remainder standing in LQ of 10. It is not desired to record the 1, because as regards a quotient result, such 1 is meaningless. Therefore in recording, provision is made for suppressing the recording of the 1 standing in LQR and for recording in lieu thereof a zero derived from another source.

In connection with the rounding off feature, it should be further noted that rounding off is of no consequence or utility unless the quotient result is computed to at least two places. Accordingly, if dividing calculations are made to less than two orders, provision is made for wholly suppressing the rounding off operation, including the entry of a 5 in a selected order.

With dividing calculations, the rounded off order of the quotient may assume a variable column relation on the final record. This will directly depend on the relative magnitude of the entered divisor and dividend and such rounding off column may vary from card to card due to the variable change of the reading out relation in recording the quotient. In short, in dividing, rounding off may occur in a variable final column of the result. In dividing, rounding off is effected in a selected fixed column of the LQ accumulator, but between the LQ accumulator and the punch there is a column shift mechanism so that the ultimate effect on final recording is to vary the column in which rounding off is effected.

To prepare the machine for rounding off operations, the insertible plugboard utilized for such operations will have established a plug connection between socket 393 (Fig. 22g) and one of the group of the 394 sockets. The particular one of the 394 sockets which is plugged for the computation on Fig. 25 is the second socket from the right. Another plug connection will be established between sockets 395 and 396 (Fig. 22d).

This latter plug connection will bring about a maintained energization of relay coil J inasmuch as contacts AK25 are closed throughout all dividing operations.

Referring now to Fig. 22f, with relay coil J energized, relay contacts J3—6 will be in reverse position from that shown and accordingly, with a plug connection between socket 389 and the second 390 socket from the left, signifying a two place quotient computation, the machine will not terminate its computing operations with the arm of the stepping switch SB establishing contact with the second contact spot, but in contradistinction the machine will continue computation until the switch arm establishes contact with the third contact spot. The foregoing control will carry the computations performed by the machine on division to one further cycle beyond that required for the second quotient place.

Referring now to Fig. 22f, energization of relay coil J will shift the J1 contacts to reverse position from that shown. Such contact shift will place the 340SD stepping switch coil in parallel with the 340SB stepping switch coil so that upon each energization of 340SB there will be an energization of 340SD.

As shown in Fig. 25, the 5 entry is made in the second comparing cycle, viz. the cycle in which the amount of 374 is the dividend comparison portion. Such 5 entry is always made during such comparison cycle. The 5 entry into the selected column of the LQ accumulator is brought about in the following manner. During the cycle mentioned relay coil CSb becomes energized, closing contacts CSb6 (Fig. 22g). Likewise during the portion of the cycle in which the dividend is being compared, relay coil DD is energized causing closure of contacts DD14. Cam contacts CC22 are timed to close at the "5" index point in the cycle. Accordingly, a current impulse will flow at such time from line 301, through CSb6, through DD14, through CC22, via plug connection from socket 393, to the selected socket 394 and thence down to the related columnar order of LQ, in this instance, the third accumulator magnet from the extreme left. This will enter 5 in such accumulator during the above mentioned comparison cycle.

According to the rounding off operation as shown in Fig. 25 relay coil H will become energized not in the second quotient entry cycle, but in the following or third quotient entry cycle. This will be effected by the control which is afforded by relay coil J, J3—6 contacts and the SB stepping relay. By the time the H relay coil has become energized, the quotient digit of 6 (see Fig. 25) will have been entered in the order of LQ which receives the 5 entry. The usual carry will take place and the setting in the hundreds order of LQ will be augmented from 7 to 8.

It has been explained heretofore that the stepping relay magnet 340SD will be energized concurrently with the energization of stepping magnet 340SB. Inasmuch as the SB switch steps to the third contact position, the SD switch (Fig. 22h) will likewise step to the third contact position and place relay coil FF in circuit with line 301. It has been previously explained that under control of contacts RD7 (Fig. 22c) relay coils AAt and Zh (Fig. 22c) and relay coils A and AB (Fig. 22d) were energized to control punching. At the time such relay coils become energized, a circuit is also completed through relay coil FF (Fig. 22h), via wire 397 (Fig. 22d) to the right side of coil A. Such coil is maintained energized throughout punching operations by the stick circuit extending through contacts A1 as previously explained. With relay coil FF energized (Fig. 22h), the contacts FF1 will shift to reverse position and with such contacts shifted, the circuit from the common readout segment in the tens order of LQR will be cut off and such circuit will be completed over to line 392, which it will be recalled, is a circuit to the zero 353 interposer punch selector magnet. Thus in lieu of punching a 1, the amount standing in the tens order of the LQ accumulator, there will be a zero punched on the record card in the related order.

Provision is made to delay release of the SD stepping relay switch arms until after punching is completed in this type of operation. Referring to Fig. 22e, the manner of energization of 321LQ has been previously explained. When such coil becomes energized, a circuit is completed from the AS9 contacts in the position shown, over through the AK6 contacts now closed, through cam contacts CC21, to energize the 341SD release magnet. While there is also an energization of 341SE at this time, this is without effect because the SE relay is now in home position. Energization of 341SD, however, will release the arms of this stepping switch (Fig. 22h) and allow them to return to home position as shown.

*Automatic place limiting controls*

It will be appreciated that the number of quotient places which the machine is adapted to compute depends upon several factors, viz. the number of available places or orders in the dividend receiving device and the number of orders in the divisor. For example, with a dividend receiving device of four orders as here shown with a one place divisor, the machine can compute to four places and no more. On the other hand, if the divisor is a two place divisor, the computing capacity will be limited to three orders. It will also be appreciated that the place limiting plugging previously described can be set say to compute to four orders of quotient places, but the computing capacity of the machine might be reached before such four orders are computed. Such capacity would be reached if a two place divisor was encountered. To take care of such conditions an automatic place limiting mechanism is provided. This automatic place limiting mechanism terminates computing operations in any event when the computing capacity of the machine is reached irrespective of whether this capacity is reached before the pre-set or pre-plugged place limiting order is reached. The automatic place limiting mechanism will also be effective to limit the number of orders computed, even if there be no pre-plugged place limiting.

As previously explained, when rounding off is employed, the computing capacity is automatically increased to an additional quotient place. However, if that quotient place cannot be computed without exceeding the computing capacity of the machine the automatic place limiting mechanism will be in control and will prevent computing when the computing capacity is reached, irrespective of the rounding off mechanism calling for a further order of quotient order computing.

In the previous explanation of dividing computations, it was explained how the W relay coils (Fig. 22c) were selectively energized depending upon the size of the divisor amount. In the particular computation explained, W$t$ was energized. Such relay coil remains energized during all dividing calculations. With such coil maintained energized, relay contacts W$t$3 (Fig. 22f) become closed and with such contacts closed, it will be appreciated that an energizing circuit is established to relay coil H when the third step of movement of the SB has taken place. Coil H will thus be energized to terminate computing, even though there be no connection whatsoever from the 389 socket to one of the 390 sockets or even if there be a connection from the 389 socket to the extreme right hand 390 socket. Such connection from 389 to the extreme right hand socket 390 would tend to call for a four place computation, but the W$t$3 contacts would terminate such series of computations after three quotient places had been calculated, which is the limit obtainable with a two place divisor amount in this machine. If the divisor amount were one place, relay coil W$u$ would be energized and would be maintained energized throughout dividing calculations. Such energized relay would close contacts W$u$3 and dividing calculations would then be invariably terminated when the stepping switch arm of SB reached its last contact position.

It will be furthermore appreciated that the foregoing controls afforded by contacts W$t$3 or W$u$3, will be effective irrespective of the shift of the J3—6 contacts, which contacts assume a shifted position on rounding off operations. Accordingly, the automatic place limiting controls have a predominating control even when augmented calculating is being effected under rounding off control.

In Fig. 24 the sequence of operations is shown when the machine is adjusted for a dividing operation. In first card feed cycle (occurs in starting up only) the dividend and divisor fields of each record are pre-sensed for the highest orders containing significant digits. During the first machine cycle of the next card feed cycle the divisor is entered into the ML devices and the dividend is entered into RD, both in shifted to the left relationship in accordance with the previous pre-sensing. In the two following cycles divisor multiple build-up is effected. In the first of these, or the second half of the card feed cycle the succeeding record is pre-sensed. Provided recording is completed on a previous record during the second of these cycles LQ reset occurs during the next machine cycle to initiate dividing operations. As has been previously explained, a significant quotient digit is obtained in two machine cycles. In the first of these comparison is effected between all nine divisor multiples and a selected comparison portion of the dividend. In the second of these a divisor multiple, selected in accordance with the comparison, is subtracted from the dividend and there is an entry of a related quotient digit in LQ. Such comparing, deducting and quotient digit entering cycles follow until computing operations are terminated by the place limiting devices. It may be mentioned that if a non-comparison condition exists this is indicative that the quotient digit is zero and the machine automatically eliminates the deducting cycle which normally follows and immediately follows with another comparing cycle. It will be observed that if the rounding off device is utilized the entry of a 5 takes place during a second comparison cycle provided such occurs.

Upon termination of computing operations, there is a machine cycle in which reset of the ML and RD devices and initiation of punching occur following which card feed of the succeeding record takes place.

What is claimed is:

1. In a dividing machine having dividing mechanism and provided with a quotient accumulator comprising denominationally ordered digit receiving elements and successively operated means for directing quotient digit entries in said accumulator elements, the combination of a "5" entry means, selective means for operatively coordinating said "5" entry means with the element of the accumulator which receives the last quotient digit entry for performing a rounding off operation of said element, and means under control of the entry directing means associated with an accumulator element other than the accumulator element selected by said selective means for rendering said "5" entry means effective to effect the "5" entry therein.

2. In a dividing machine provided with a dividing mechanism of the type which utilizes one comparison machine cycle for effecting a comparison of all digital multiples of the divisor amount with a comparison portion of a dividend accumulator and a following quotient digit entering machine cycle for entering a significant quotient digit selected as a result of such comparison, in a quotient receiving accumulator, said dividing machine including means successively operated as the comparison cycles successively ensue, the combination of "5" entry means, selective means for operatively coordinating said "5" entry means with the element of the accumulator which receives the last quotient digit entry for performing a rounding off operation of said element, connecting means, and means for rendering said connecting means effective for each comparison cycle of the machine for operatively coordinating, in a comparison machine cycle determined by one of the successively operated means, said "5" entry means through such operated means with the accumulator element selected by said selective means to enter "5" therein.

3. In a dividing machine provided with a dividing mechanism of the type which utilizes one comparison machine cycle for effecting a comparison of all digital multiples of the divisor amount with a comparison portion of a dividend accumulator and a following quotient digit entering machine cycle for entering a significant quotient digit selected as a result of such comparison, in a quotient receiving accumulator, said dividing machine including successively operated entry directing means for directing quotient digits in said accumulator elements, one of which is also operated in the preceding comparison cycle to be capable of directing a "5" entry, the combination of "5" entry means, selective means for operatively coordinating said "5" entry means with the element of the accumulator which receives the last quotient digit entry for performing a rounding off operation of said element, connecting means, and means for rendering said connecting means effective for each comparison cycle of the machine for operatively coordinating, in the comparison machine cycle the entry directing means capable of directing a "5" entry is operated, said "5" entry means through said entry directing means with said selected accumulator element to enter "5" therein.

4. In a record controlled dividing machine having dividing mechanism for the automatic operation of division of dividend and divisor amounts and including means controlled thereby for successively deriving the quotient digits, the combination of a quotient receiving accumulator for receiving the successive quotient digits, quotient place limiting control means for terminating the operation of said dividing mechanism upon securing a predetermined number of digits and including operator settable means coordinated therewith set according to a predetermined number of quotient digits to be obtained, both of said means jointly acting to terminate the operation of said dividing mechanism upon entering in said receiving means the predetermined number of quotient digits, means intermediate said place limiting control means and said operator settable means for modifying the operative relationship between said settable means and the operator settable means to delay the termination of the operation of the dividing mechanism upon securing a predetermined number of quotient digits and to enable said dividing mechanism to compute an additional quotient digit, a "5" entry means, and means for effecting the "5" entry in the accumulator order element the final quotient digit is entered including supplemental operator settable means for operatively associating said "5" entry means with such accumulator order element.

5. In a dividing machine having dividing mechanism including a quotient receiving accumulator having tens transfer means, and result recording mechanism controlled by denominationally ordered elements of said accumulator and including in combination, means for rounding off computed quotient results to the nearest whole unit including entering means for automatically introducing an extra "5" amount into a selected order element of the quotient accumulator for, at times, by the operation of inter-related transfer means, augmenting the digit result in the next order element at the left by a unit, operator positionable means for causing said entering means to be connected to a selected order element of the accumulator into which the "5" amount is to be entered, means positionable concurrently upon each operation of the dividing mechanism for computing each quotient digit and including the dividing operation for the final quotient digit, and means controlled by said last named means for disconnecting the order element of the quotient accumulator which receives the final quotient digit and the "5" entry from the recording mechanism and for causing the "0" recording element of the recording mechanism to record a zero in the related columnar order.

6. In a dividing machine having dividing mechanism and including a quotient digit receiving accumulator for receiving successive quotient digits, the combination of quotient recording means including a zero recording source means, quotient place limiting means including settable means successively set according to the number of quotient digits desired for thereupon terminating operations of the dividing mechanism, said quotient place limting means including a stepping means positionable step by step for successive quotient digit computing operations, means for connecting said quotient recording means with said accumulator for control of recording of the quotient result, means for delaying the effectiveness of said quotient place limiting means upon said dividing mechanism for an additional quotient digit computing operation to enter a digit in a final order element of said accumulator, rounding off means including a "5" entry means, means to selectively enter said "5" amount in the final order element of said accumulator to augment the accumulator order element next to the left to a unit, at times, and means controlled by said stepping means upon being positioned at a position corresponding to the final quotient digit computing operation to disconnect the final order accumulator element from control over the quotient recording means and for causing the operation of the zero recording source means for the related columnar recording.

7. In a dividing machine having dividing mechanism including a quotient receiving accumulator having tens transfer means, and result recording mechanism controlled by denominationally ordered elements of said accumulator and including in combination, means for rounding off computed quotient results to the nearest whole unit including common entering means for automatically introducing an extra "5" amount into a selected final order element of the quotient accumulator for, at times, by the operation of inter-related transfer means augmenting the digit result in the next order element at the left by a unit, operator positionable means for causing said entering means to be connected to a selected order element of the accumulator into which the "5" amount is to be entered, quotient place limiting means comprising means successively positionable for successive operations of the dividing mechanism for computing the quotient digits and including operator settable means for rendering the place limiting means effective upon securing a predetermined number of quotient digits, means for delaying the effectiveness of said quotient place limiting means to enable said dividing mechanism to effect the computation of the final quotient digit, and means controlled by said positionable means upon taking a position for the final quotient digit for disconnecting the final order element of the quotient accumulator which receives the final quotient digit and the "5" entry, from the recording mechanism and for causing the "0" recording element of the recording mechanism to record a zero in the related columnar order.

JAMES W. BRYCE.
ARTHUR H. DICKINSON.